(12) United States Patent
Hamamoto et al.

(10) Patent No.: US 6,853,416 B2
(45) Date of Patent: Feb. 8, 2005

(54) LIQUID CRYSTAL DISPLAY DEVICE

(75) Inventors: Tatsuo Hamamoto, Mobara (JP); Yoshifumi Tomita, Mobara (JP); Tomoaki Tsuboka, Mobara (JP); Minoru Hiroshima, Chousei (JP)

(73) Assignee: Hitachi, Ltd., Tokyo (JP)

( * ) Notice: Subject to any disclaimer, the term of this patent is extended or adjusted under 35 U.S.C. 154(b) by 393 days.

(21) Appl. No.: 09/905,957

(22) Filed: Jul. 17, 2001

(65) Prior Publication Data

US 2002/0011971 A1 Jan. 31, 2002

(30) Foreign Application Priority Data

Jul. 28, 2000 (JP) ...................................... 2000-228314

(51) Int. Cl.⁷ ......................................... G02F 1/1335
(52) U.S. Cl. ......................................... 349/106; 349/80
(58) Field of Search .................... 349/80, 97, 104–109, 349/106

(56) References Cited

U.S. PATENT DOCUMENTS

| | | | |
|---|---|---|---|
| 5,059,000 A | * | 10/1991 | Kaneko et al. ................ 349/20 |
| 6,016,178 A | * | 1/2000 | Kataoka et al. .............. 349/117 |
| 6,137,459 A | | 10/2000 | Eida et al. |
| 6,358,652 B1 | * | 3/2002 | Tomiuchi et al. ............... 430/7 |
| 6,517,213 B1 | | 2/2003 | Fujita et al. |
| 2002/0071071 A1 | * | 6/2002 | Sekiguchi et al. ........... 349/106 |
| 2003/0107692 A1 | * | 6/2003 | Sekiguchi ..................... 349/113 |

FOREIGN PATENT DOCUMENTS

| JP | 11202118 A | * | 7/1999 | ............ G02B/5/20 |
|---|---|---|---|---|
| KR | 2000-16102 | | 3/2000 | |

* cited by examiner

*Primary Examiner*—Jerome Jackson
*Assistant Examiner*—José R. Díaz
(74) *Attorney, Agent, or Firm*—Reed Smith LLP; Stanley P. Fisher, Esq.; Juan Carlos A. Marquez, Esq.

(57) ABSTRACT

In a liquid crystal display device comprising color filters therein, the present invention provides a color-converting material in at least one of the color filters which converts a part of an incident light of the at least one of the color filters into a light in a specific wavelength range together with a filter material passing the light in the specific wavelength range, so as to prevent deterioration of color purity of the light emitted thereby and to improve efficiency of optical utilization therein.

5 Claims, 18 Drawing Sheets

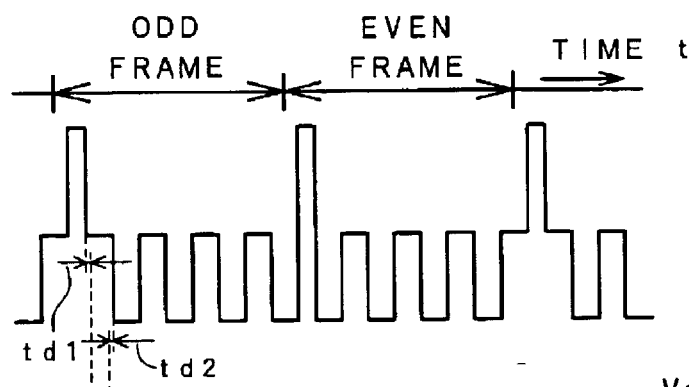
FIG. 20A $V_{G(i-1)}$
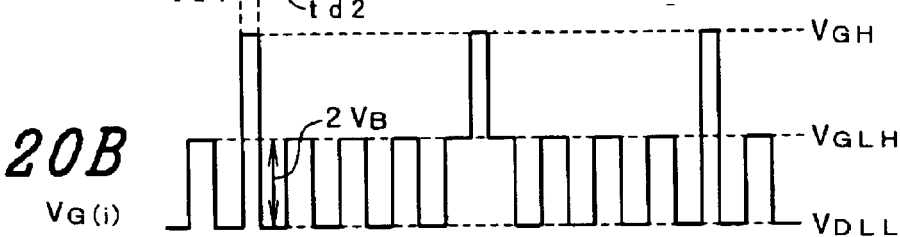
FIG. 20B $V_{G(i)}$
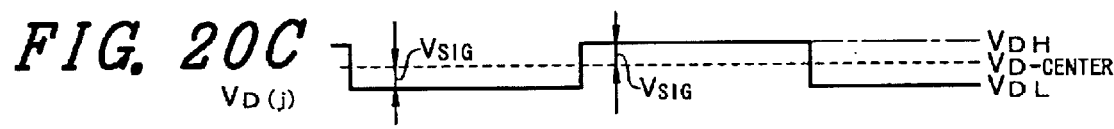
FIG. 20C $V_{D(j)}$
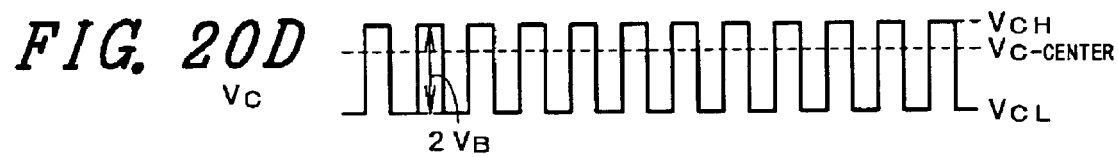
FIG. 20D $V_C$
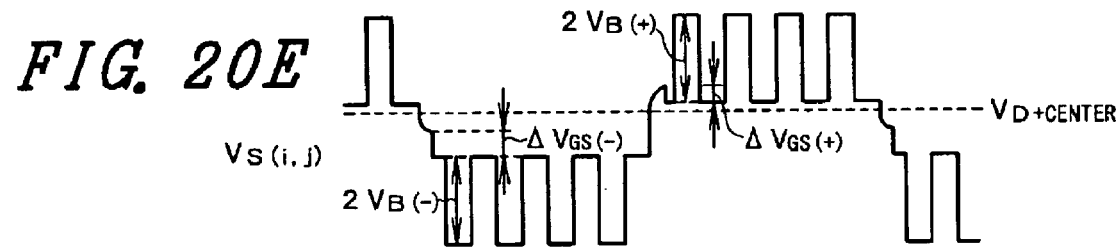
FIG. 20E $V_{S(i,j)}$
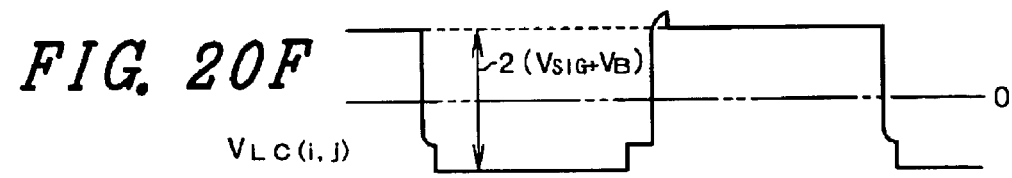
FIG. 20F $V_{LC(i,j)}$

DIRECTION OF SIGNAL FLOW

LIQUID CRYSTAL DISPLAY DEVICE

BACKGROUND OF THE INVENTION

1. Field of the Invention

The present invention relates to a liquid crystal display device capable of providing color display and, more particularly, to a liquid crystal display device using novel color filters which are improved in the efficiency of utilization of light.

2. Description of the Related Art

Liquid crystal display devices are widely used as high-resolution display terminals for notebook type computers and computer monitors. Liquid crystal display devices are remarkable in technological advance, and have been able to provide display qualities which are close to those of CRTs. However, the liquid crystal display devices have not yet been satisfactory in terms of kinetic image display, color reproducibility and brightness, and also have the problem that a further reduction in manufacturing cost is needed.

The liquid crystal display devices are classified into a simple matrix type in which multiple pairs of electrodes which intersect each other are formed on the inner surfaces of a pair of substrates and pixels are formed at the respective intersection positions, and an active matrix type in which each pixel has a switching element. In particular, the active matrix type of liquid crystal display device is classified into a so-called vertical electric field type (TN type) and a so-called in-plane switching type (IPS type) in accordance with liquid crystal driving mode thereof.

The vertical electric field type of liquid crystal display device includes transparent substrates which are disposed in opposition to each other with a layer of liquid crystal compounds (hereinafter referred to simply also as a liquid crystal layer) being interposed therebetween, pixel electrodes made of transparent electrodes which are respectively disposed in regions corresponding to unit pixels on the liquid-crystal-side surface of either one of the transparent substrates, and counter electrodes made of transparent electrodes which are respectively disposed in the regions on the liquid-crystal-side surface of the other of the transparent substrates. The vertical electric field type of liquid crystal display device is constructed to visibly display an image or the like by modulating light which passes through the liquid crystal layer, by means of electric fields generated between the pixel electrodes and the counter electrodes perpendicularly to the transparent electrodes.

The in-plane-switching type of liquid crystal display device includes transparent substrates which are disposed in opposition to each other with a liquid crystal layer being interposed therebetween, and pixel electrodes and counter electrodes which are disposed on either or both of the liquid-crystal-side surfaces of the respective transparent substrates in such a manner that a pixel electrode and a counter electrode are disposed in each region corresponding to a unit pixel. The in-plane-switching type of liquid crystal display device is constructed to visibly display an image or the like by modulating light which passes through the liquid crystal layer, by means of electric field components generated between the pixel electrodes and the counter electrodes approximately in parallel with the transparent electrodes.

Unlike the vertical electric field type of liquid crystal display device, the in-plane-switching type of liquid crystal display device is known as a device which is superior in so-called viewing angle characteristic, because a user can view a clear image or the like even when the user observes the display surface at a large viewing angle relative thereto.

FIG. 25 is a diagrammatic cross-sectional view for schematically explaining electric fields for pixel formation in an in-plane-switching type of liquid crystal display device. FIG. 26 is a plan view for schematically explaining the construction of one pixel and the vicinity thereof on the lower substrate shown in FIG. 25.

This liquid crystal display device has video signal lines (drain lines) DL, counter electrodes (common electrodes) CT and pixel electrodes PX all of which are formed on one substrate SUB1 which constitutes the lower substrate. The liquid crystal display device also has a protective film PSV deposited to overlie these electrodes DL, CT and PX, and a lower alignment control layer (lower alignment film) ORI1 at the interface between the protective film PSV and a liquid crystal LC. A gate insulating layer GI is provided for covering scanning lines or scanning electrodes (gate lines or gate electrodes) GL.

Each of the video signal lines DL is made of two metal layers d1 and D2, and each of the counter electrodes CT is composed of a metal layer g1 and a protective layer AOF formed to cover the metal layer g1.

A plurality of color filters FIL (in this example, color filters for three colors) partitioned by a black matrix BM are formed on a substrate SUB2 which constitutes an upper substrate, and an overcoat layer OC is formed to cover these color filters FIL. This overcoat layer OC has the function of prevent the constituent material of the color filters FIL or the black matrix BM from penetrating the liquid crystal LC and affecting the characteristics of the liquid crystal LC, as well as the function of leveling the surfaces of the respective color filters FIL. An upper alignment control layer (upper alignment film) ORI2 is formed at the interface between the overcoat layer OC and the liquid crystal LC.

Upper and lower polarizers POL1 and POL2 are stacked on the outer surfaces of the upper and lower substrates SUB1 and SUB2, respectively.

As shown in FIG. 26, a thin film transistor TFT uses a gate line GL as its gate electrode, and has a source electrode SD1 and a drain electrode SD2 which extends from a drain line DL. The source electrode SD1 and the drain electrode SD2 are formed over the gate line GL with a semiconductor layer AS being interposed therebetween, and common electrodes CT extend from a common electrode CT in such a manner as to be disposed adjacent to a pixel electrode PX.

In general, in the related-art liquid crystal display device, a color filter layer composed of three kinds of color filters each of which passes therethrough only a specific wavelength range of light illuminating the display device is used as means for colorizing images. This color filter layer is intended to realize a full color display by dividing a pixel corresponding to one dot of a color display into three unit pixels and disposing filters which respectively correspond to red (R), green (G) and blue (B) in each of the unit pixels as the three primary colors (display primary).

SUMMARY OF THE INVENTION

A liquid crystal display device having such color filters provides the desired color display by controlling the polarization of light passed from an illuminating device. According to an estimation of light losses in color display, a light loss due to absorption by polarizers is approximately 60% and a light loss due to absorption by color filters is 70% or more, and the overall light loss is approximately 88%.

It turns out that even if light losses due to other causes are eliminated, a maximum of approximately 12% of the light emitted from the illuminating device is only utilized as the result of the light losses due to absorption by the polarizers and the color filters.

On the other hand, display devices using liquid crystal display devices are required to have high luminance at low power consumption. For this reason, an improvement in the efficiency of utilization of light of color filters as well as an improvement in color reproducibility is one of large problems to be solved.

FIG. 27 is a diagrammatic view for explaining an example of the construction of related-art color filters. This kind of color filter FIL has a structure in which a red-colored layer (denoted by R-Filter in drawings, hereinafter), a green-colored layer (denoted by G-Filter in drawings, hereinafter) and a blue-colored layer (denoted by B-Filter in drawings, hereinafter) are disposed on the inner surface of the upper substrate SUB2 made of a transparent substrate (generally, a glass substrate). In FIG. 27, symbol BM denotes a black matrix which partitions the color filters FIL to improve contrast.

The respective colored layers which constitute one pixel are formed of filter materials which are respectively made of resins (for example, polymers such as acrylic resin) in which red, green and blue pigments are respectively dispersed, or of similar polymers dyed with dyes such as red, green and blue dyes.

Each of the red-colored layer R-Filter, the green-colored layer G-Filter and the blue-colored layer B-Filter which constitute the respective color filters FIL selectively passes the components contained in a specific wavelength range (a wavelength range corresponding to the color of each of the colored layers) of light (denoted by W-light in drawings, hereinafter) which is emitted from a white-light illuminating light source (backlight BL, denoted by W-light Illuminating Means in drawings, hereinafter), while each of the colored layers absorbs light in the other wavelength range. As a result, the absorbed light is not utilized, and the efficiency of utilization of light incident from the illuminating device becomes low.

If the transmissivity of light is to be increased, the absorption of incident light must be reduced. In this case, however, the color purity of transmitted light becomes low and impairs color reproducibility. As countermeasures, for example, there are a color-filter construction which uses diffraction of light as disclosed in Japanese Patent Laid-Open No. 300934/1998, and a color-filter construction in which a wavelength converting layer is provided on a light-incidence side of a color filter as disclosed in Japanese Patent Laid-Open No. 202118/1999.

However, these color filters cannot be manufactured by the present widely used type of manufacturing facility or process for color filters, or it is necessary to add a large number of processes to the manufacturing process. This fact incurs an increase in manufacturing cost, resulting in a remarkable increase in product price.

An object of the invention is to provide a liquid crystal display device in which a decrease in color purity is prevented to improve the efficiency of utilization of light and an increase in manufacturing cost is restrained.

To achieve the above object, the liquid crystal display device according to the invention is provided with a color filter which has in the same layer a color-converting material (color-changing material) converting part of incident light into light in a specific wavelength range, and a filter material which is a coloring agent passing the light in the specific wavelength range. In the manufacture of this color filter, since the color-converting material which converts the wavelength of part of incident light and the filter material passing light in the specific wavelength range are formed at the same time, it is not necessary to add steps to an existing manufacturing process.

The concentration of the coloring agent which is the filter material is set so that the transmissivity of the filter material in the absorbed wavelength range thereof becomes 0% to 50%. Light in this absorbed wavelength range is converted into light in the wavelength range passing through the filter material by the color-converting material which is present in the same layer as the filter material, whereby the amount of light in the wavelength range passing through the filter material is increased. Thus, color purity and brightness are improved at the same time.

In addition, the density content of the color-converting material is given a distribution in the film thickness direction of the color filter so that the color-converting effect of the color-converting material is higher toward an incidence side of illuminating light. Accordingly, it is possible to effectively convert incident light into light in the wavelength range passing through the filter material. The distribution of the density content of the color-converting material can be realized by forming two or more layers in the color filter layer in the thickness direction thereof or by giving a gradation of the content of the color-converting material to the color filter from the incidence side toward the exit side of light.

A liquid crystal display device is provided with a monochromatic light illuminating device which emits only one primary color, as a light source for illuminating the liquid crystal display device, and a color filter includes a plurality of areas each having a color-converting material for absorbing light in a wavelength range emitted from the monochromatic light illuminating device and converting a primary color in another wavelength range different from the wavelength range of the one primary color, and areas having neither filter materials nor color-converting materials.

A monochromatic-color light source can obtain a higher emission intensity than a white-color light source of the same emission area and the same power. Furthermore, since the wavelength of light radiated from the monochromatic-color light source is set to the wavelength of one primary color, a filter layer corresponding to the one primary color is not needed, so that no attenuation occurs in light of such one primary color. The process of manufacturing the color filter can be made simple while maintaining color purity at low cost, whereby it is possible to obtain a liquid crystal display device which is brighter and is of higher color purity than related-art liquid crystal display devices.

The above-described color filter is provided on one of substrates which constitute a color liquid crystal display device. The type of this liquid crystal display device may be a vertical electric field or in-plane switch type of active matrix type which uses thin film transistors as pixel selecting elements, or a so-called simple matrix type.

Incidentally, in the description of the invention, reference will be made to a color filter to be used in a color liquid crystal display device in particular, but it goes without saying that the invention can similarly be applied to color filters of other display devices using multi-color filters.

These and other objects, features and advantages of the present invention will become more apparent from the following description when taken in conjunction with the accompanying drawings.

BRIEF DESCRIPTION OF THE DRAWINGS

FIG. 10 is an explanatory view of the relationship between film thickness and transmissivity, in which FIG. 9 is again plotted;

FIGS. 20A to 20F are diagrams of driving waveforms of the liquid crystal display device according to the invention; FIG. 20A shows the waveform of a scanning signal $VG_{(i-1)}$, FIG. 20B shows the waveform of a scanning signal $VG_{(i)}$, FIG. 20C shows the waveform of a video signal D, FIG. 20D shows the waveform of a counter voltage VC, FIG. 20E shows the waveform of a pixel electrode potential $VS_{(i-1)}$, and FIG. 20F shows the waveform of a potential $VLC_{(i,\,j)}$;

DETAILED DESCRIPTION

Figure 1:
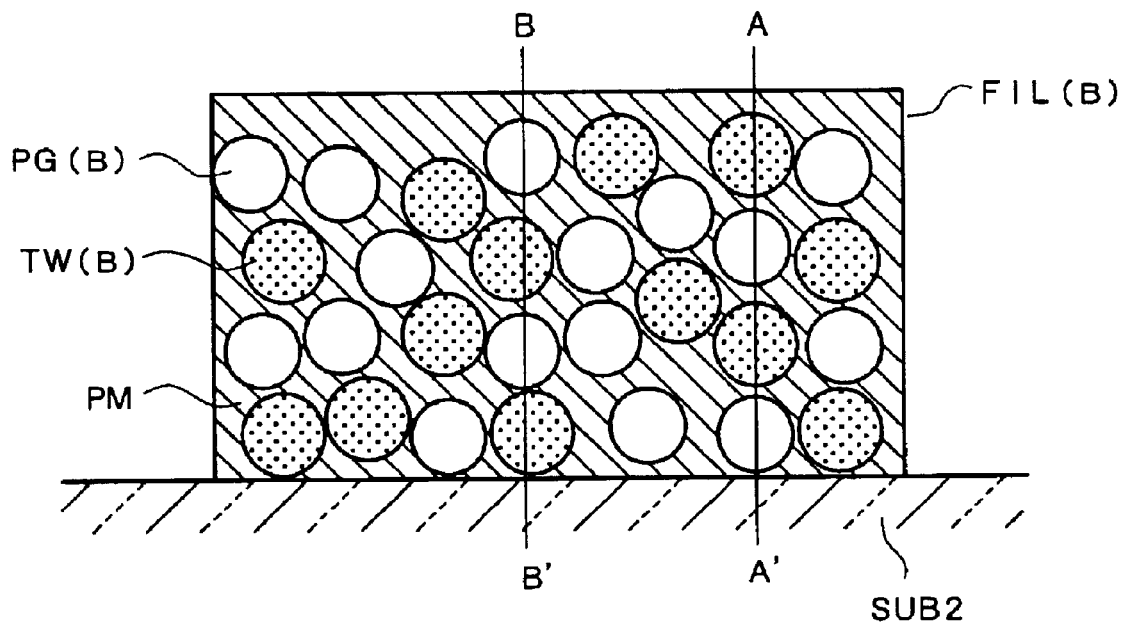
FIG. 1 is a cross-sectional view for diagrammatically explaining the construction of a color filter used in a first embodiment of the liquid crystal display device according to the invention.

Embodiments of the invention will be described below in detail with reference to the accompanying drawings.

Known examples of the method of manufacturing color filters for this kind of liquid crystal display device are a printing method to which the principle of printing is applied, a dyeing method and a pigment dispersing method both of which use photo lithography, and an electrodeposition method of electrochemically depositing dyes (pigments) (refer to, for example, "Deposition Techniques for Color Filters and Chemicals", 1 Feb. 1998, First Printing, pp27–85).

A method of manufacturing color filters according to the invention will be described below. In the method which uses photo lithography which is currently widely used, as a process of forming color filter layers on a substrate such as a glass plate (hereinafter, a glass substrate), first of all, a glass substrate having cleaned surfaces is coated with a photosensitive resin compound containing pigments.

The coating means used in this process is contact-type transferring and coating equipment such as a roller coating apparatus, a reverse coating apparatus, a bar coating apparatus, or noncontact-type transferring and coating equipment, a spin coating apparatus, a curtain flow coating apparatus and a slit coating apparatus. The entire surface of the glass substrate is coated with the photosensitive resin compound by the noncontact-type coating equipment so that the photosensitive resin compound becomes approximately 0.5–3 μm thick in its dry state.

To improve the adherence between the glass substrate and the photosensitive resin compound at this time, a silane coupling agent is previously added to the photosensitive resin compound, or the glass substrate is pretreated with a silane coupling agent. As described in Japanese Patent Laid-Open No. 212161/1992, a pigment-containing photosensitive resin compound which is coated on an organic resin film may be thermally transferred to a glass substrate so that the pigment-containing photosensitive resin compound is formed on the entire surface of the glass substrate.

The pigments may be organic pigments or inorganic pigments, or dyes (dye stuffs) may be used. Since the pigments are insoluble to water or organic solvents and, specifically, pass visible light, it is desirable that the particle size of the pigments is not greater than half (½) wavelength of transmitted light. For example, it is recommended that pigments having an average particle size (particle diameter) of 200 nm or less should be dispersed in the photosensitive resin compound.

Preferred examples of blue pigments, red pigments and green pigments are phthalocyanine pigments, anthraquinone pigments and halogenated phthalocyanine (phtahlocyanine halide) pigments, respectively. One kind of pigment may be used for each color, or two or more kinds of pigments for each color may be used together.

It is preferable that the pigment-containing photosensitive resin compound be coated on (or over) a main surface of the substrate as a paste in which the particles of the pigments are dispersed in an organic solvent together with a dispersant or a resin. In general, the photosensitive resin compound is a negative type resist which contains a polyhydric acryl and a photo radicals generating agent as photosensitive components.

Subsequently, the film of the pigment-containing photosensitive resin compound on the glass substrate is exposed via an exposure mask (photomask) having a predetermined aperture pattern. Ultra violet rays, excimer laser rays, X rays, gamma (γ) rays and electron-beams are suitable as active energy rays to be irradiated during the exposure process.

Energy dose amounts (e.g. fluence) during the exposure slightly change according to the kind of photosensitive resin compound used, but are preferably set to approximately 100 $mJ/cm^2$. Through this exposure, according to the predetermined pattern of the exposure mask, a non-soluble area insoluble to a developer which will be described later is formed in the film of the photosensitive resin compound if the photosensitive resin compound is of the negative type, or a soluble area soluble to the developer is formed in the film of the photosensitive resin compound if the photosensitive resin compound is of the positive type.

Figure 3:
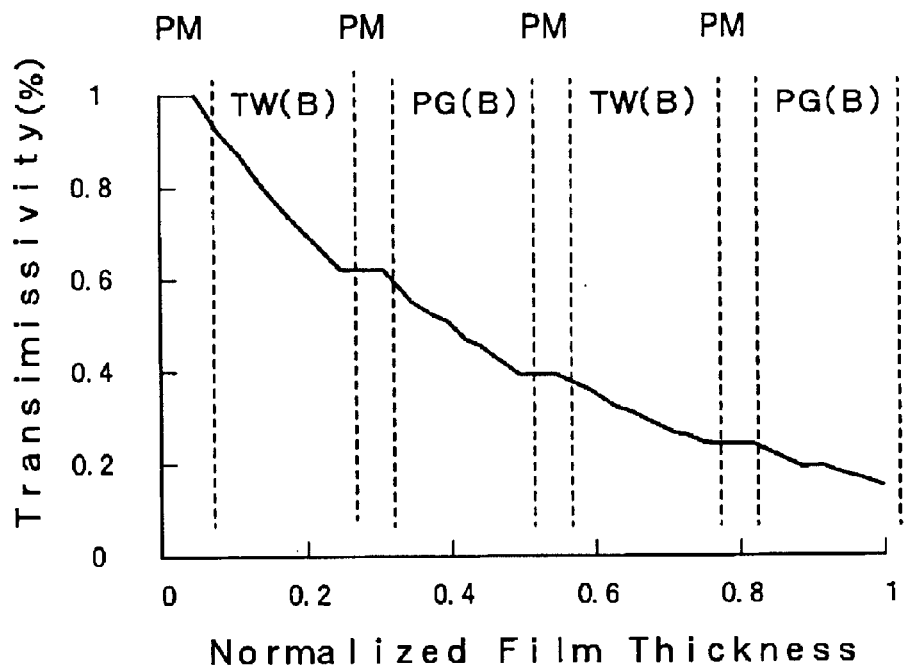
FIG. 3 is an explanatory view of the transmissivity of the color filter shown in FIG. 1 with respect to normalized film thickness.

Then, the exposed photosensitive resin compound is subjected to spraying development or dip development using an inorganic developer such as sodium hydroxide, potassium hydroxide, sodium carbonate, ammonia (ammonia liquor) or quaternary ammonium salt, or an organic developer such as monoethanolamine (MEA), diethanolamine (DEA) or triethanolamine, whereby the soluble area is selectively removed. By repeating this process three times, the color filters FIL having the structure shown in FIG. 3 are formed.

During this time, the pigment-containing photosensitive resin compound in which a color-converting material is dispersed or solved in the form of solid solution is used to form the color filters in the above-described process using photo lithography. Through this process, each filter layer for the same color can be made to contain a color-converting material which converts part of the incident light thereof into a light in a specific wavelength range, and a filter material which passes only the light in the specific wavelength range.

In this case, it is desirable to select photosensitive components so that the photosensitive wavelength range of the pigment-containing photosensitive resin compound and the absorbed wavelength range of the color-converting material can be as much as possible prevented from overlapping each other.

In addition to the above-described method using photo lithography means, a printing method to which the principle of printing is applied can also be applied to the process of forming the color filters in which the same layer is provided with the color-converting material which converts part of the incident light thereof into a light in a specific wavelength range, and the filter material which passes only the light in the specific wavelength range. For example, if a pigment-containing photosensitive resin compound in which a color-converting material is dispersed or solved is formed on the necessary portion of the glass substrate by using an ink jet apparatus or a dispenser, similar advantages can be obtained. In this case, since no photosensitive resin compound is used, the absorbed wavelength range of the color-converting material can be made far wider.

The particles of the color-converting material convert part of the incident light thereof into a light in a specific wavelength range, and the particles of the filter material (pigment) passes only the light in the specific wavelength range. In other words, the action of color conversion and the action of absorbing the light in the specific wavelength occur in the same layer at the same time. Examples of the color-converting material are as follows.

(I) Coumarin 337, Coumarin 523, [2-[2-[4-(Dimethylamino) phenyl]-6-methyl-4H-pyran-4-ylidene]propanedinitrile, and Coumarin 102, all of which are disclosed in Japanese Patent Laid-Open No. 202118/1999.

(II) Yttrium.Aluminum.Garnet-series Fluorescent Material activated by adding Cerium thereto, which is disclosed in Japanese Patent Laid-Open No. 242513/1998.

(III) Materials which converts light emitted by light emitting elements in a near-ultraviolet to violet region into blue emission, which materials are described in Japanese Patent Laid-Open No. 80434/1997 and U.S. Pat. No. 6,137,459. Examples of the materials are as follows:

1,4-Bis(2-Methylstyryl)Benzene (hereinafter referred to as Bis-MSB);

Stilbene Pigments such as trans-4,4'-Diphenylstilbene (hereinafter referred to as DPS); and Coumarin Dyes such as 7-Hydroxy-4-Methylcoumarin (hereinafter referred to as Coumarin 4).

(IV) Materials which converts light emitted light emitted by light emitting elements in a blue to blue-green region into green emission. Examples of the materials are as follows:

Coumarin Dyes such as 2,3,5,6-1H,4H-Tetrahydro-8-Trifluoromethylquinolidino (9,9a,1-gh) Coumarin (hereinafter referred to as Coumarin 153);

3-(2'-Benzothiazolyl)-7-Diethylaminocoumarin (hereinafter referred to as Coumarin 6);

3-(2'-Benzimidazolyl)-7-N,N-Diethylaminocoumarin (hereinafter referred to as Coumarin 7);

other Coumarin Dyes such as Basic Yellow 51; and naphthalimide dyes such as Solvent Yellow 11 and Solvent Yellow 116.

(V) Materials which converts light emitted light emitted by light emitting elements in a blue to green region into orange to red emission. Examples of the materials are as follows:

Cyanine Dyes such as 4-Dicyanomethylene-2-Methyl-6-(p-Dimethylaminostyryl)-4H-Pyran (hereinafter referred to as DCM);

Pyridine Dyes such as 1-Ethyl-2-(4-(p-Dimethylaminophenyl)-1,3-Butadienyl)-Pyridinium Perchlorate (hereinafter referred to as Pyridine 1);

Xanthine Dyes such as Rhodamine B and Rhodamine 6G; and

Oxazine Dyes.

It goes without saying that similar advantages can be obtained with any material other than the above-described ones, as long as the material can convert part of the emission wavelength range required for the illuminating means of a display device (hereinafter referred to as the spectral range of the light source) into a wavelength in the spectral range. Any of these color-converting materials may be uniformly dissolved in a resin (polymer) which constitutes a color filter, so as to form a solid solution. Any of these color-converting materials may also be uniformly dispersed as fine particles in a resin which constitutes a color filter. In either of the cases, any of the color-converting materials may be contained in a color filter as one component of a pigment-containing photosensitive resin compound in such a way that dyes or pigments are contained in related-art color filters. Accordingly, a method of manufacturing related-art color filters can be applied to prepare color filters which contain color-converting materials.

FIG. 1 is a cross-sectional view for diagrammatically explaining the construction of a color filter used in a first embodiment of the liquid crystal display device according to the invention, and shows a filter portion for one color (blue (B)) from among the color filters FIL. A blue filter (hereinafter referred to as a B filter) FIL(B) is formed on the glass substrate SUB2 by the above-described manufacturing method.

This B filter FIL(B) includes a polymer PM, a color-converting material TW(B) which converts part of incident light into a light (B) in a specific wavelength range (in this embodiment, the frequency range of B light), and a B pigment PG(B) which is a filter material passing the light (B) in the specific wavelength range (in this embodiment, the frequency range of B light), and the color-converting material TW(B) and the B pigment PG(B) are contained in the layer of the polymer PM.

Figures 2A, 2B:
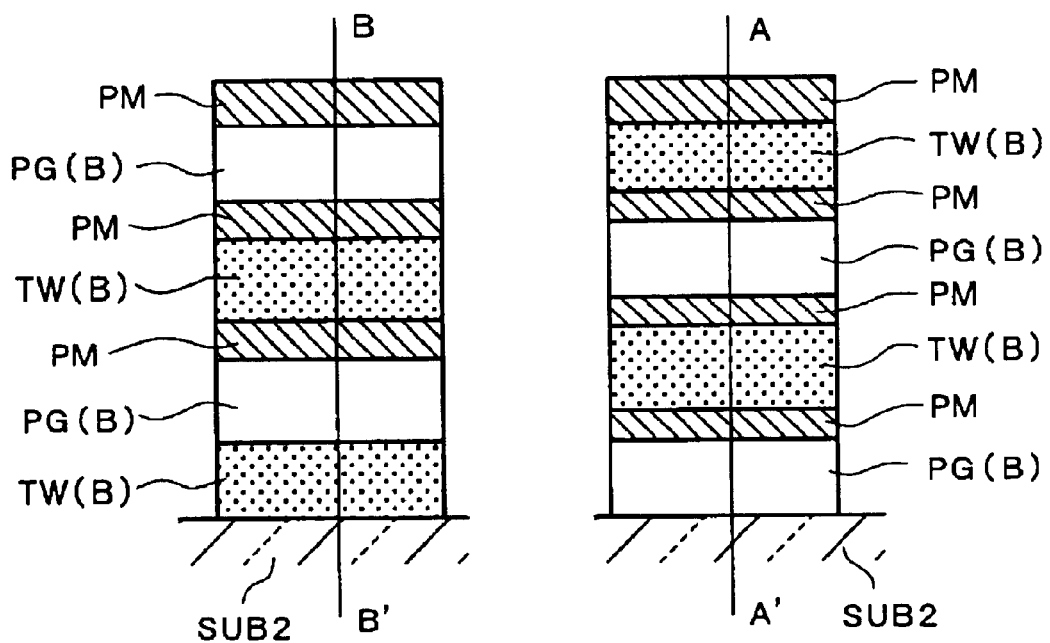
FIGS. 2A and 2B are cross-sectional views for equivalently explaining the structures of arbitrary portions taken in the thickness direction of the color filter shown in FIG. 1, FIG. 2A being a cross-sectional view taken along line A–A' of FIG. 1, and FIG. 2B being a cross-sectional view taken along line B–B' of FIG. 1.

FIGS. 2A and 2B are cross-sectional views for equivalently explaining the structures of arbitrary portions taken in the thickness direction of the B filter FIL(B) shown in FIG. 1. FIG. 2A is a cross-sectional view taken along line A–A' of FIG. 1, and FIG. 2B is a cross-sectional view taken along line B–B' of FIG. 1. The portion shown in FIG. 2A can be regarded as a structure in which the B pigment PG(B), the polymer PM, the color-converting material TW(B), the polymer PM, the B pigment PG(B), the polymer PM, the color-converting material TW(B) and the polymer PM are stacked on the glass substrate SUB2 in that order.

The portion shown in FIG. 2B can be regarded as a structure in which the color-converting material TW(B), the B pigment PG(B), the polymer PM, the color-converting material TW(B), the polymer PM, the B pigment PG(B) and the polymer PM are stacked on the glass substrate SUB2 in that order.

In the first embodiment, the polymer PM is an acrylic resin, and blue pigment particles are used as the B pigment PG(B) and a fluorescent pigment which emits light in a blue frequency range by excitation due to light energy (a blue fluorescent pigment) is used as the color-converting material TW(B).

The average particle sizes of the B pigment PG(B) and the color-converting material TW(B) are approximately the same at 0.1 $\mu$m or less, and the amounts of light to be absorbed by the B pigment PG(B) and the color-converting material TW(B) are made approximately the same. A pigment which is made small in particle size is suited to color filters for a reflection-type liquid crystal display device in which the number of pigment particles per unit volume can be made small (thin-color display).

FIG. 3 is an explanatory view of the transmissivity of the color filter shown in FIG. 1 with respect to normalized film thickness. In FIG. 3, it is assumed that the B pigment PG(B) and the color-converting material TW(B) have the same particle size, and the polymer PM is present between the B pigment PG (B) and the color-converting material TW(B) as layers having the same film thickness.

Figure 4:
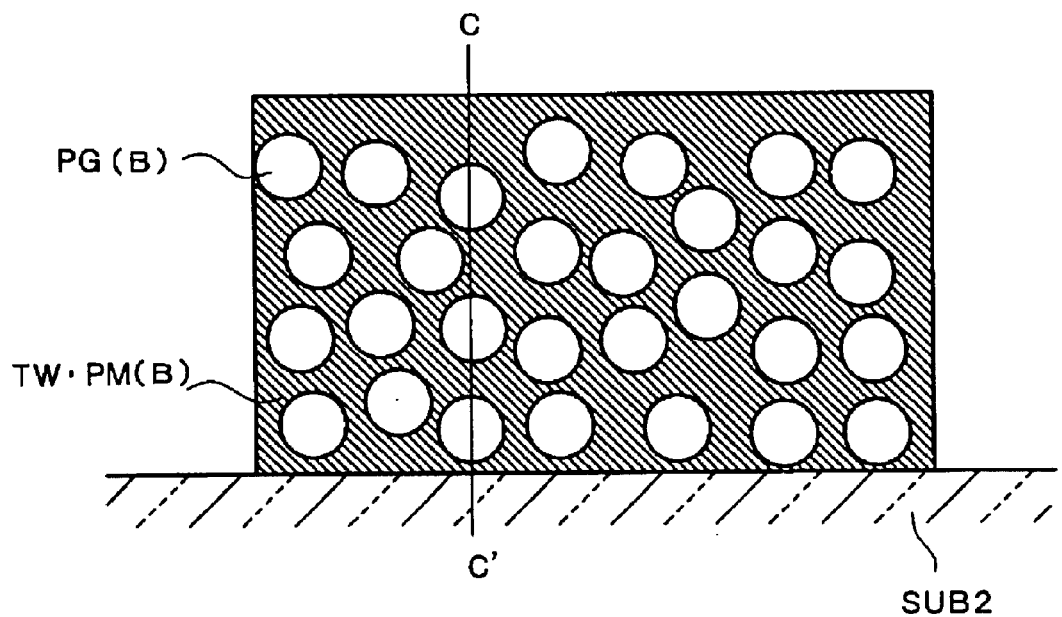
FIG. 4 is a cross-sectional view for diagrammatically explaining the construction of a color filter used in a second embodiment of the liquid crystal display device according to the invention.

FIG. 4 is a cross-sectional view for diagrammatically explaining the construction of a color filter used in a second embodiment of the liquid crystal display device according to the invention, and, similarly to FIG. 1, shows a filter portion for one color (blue (B)) from among the color filters FIL. A blue filter (hereinafter referred to as a B filter) FIL(B) is formed on the glass substrate SUB2 by the above-described manufacturing method.

This B filter FIL(B) includes a solid solution TW.PM(B) of polymer and wavelength converting material in which a color-converting material TW(B) which converts part of incident light into a light (B) in a specific wavelength range (in this embodiment, the frequency range of B light) is dissolved to form solid solution, and a B pigment PG(B) which is a filter material passing only the light (B) in the specific wavelength range, and the B pigment PG(B) is contained in the solid solution TW.PM(B) of polymer and wavelength converting material.

Figure 5:
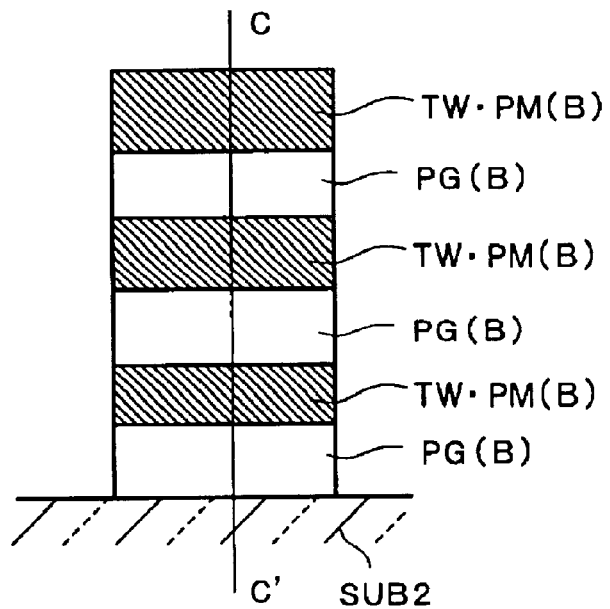
FIG. 5 is a cross-sectional view for equivalently explaining the structure of an arbitrary portion taken in the thickness direction of the color filter shown in FIG. 4.

FIG. 5 is a cross-sectional view for equivalently explaining the structure of an arbitrary portion taken in the thickness direction of the B filter FIL(B) shown in FIG. 4, and shows a cross-sectional view taken along line C–C' of FIG. 4. As shown in FIG. 5, the B filter FIL(B) can be regarded as a structure in which the B pigment PG(B), the solid solution TW.PM(B) of polymer and wavelength converting material, the B pigment PG(B), the solid solution TW.PM(B) of polymer and wavelength converting material, the B pigment PG(B) and the solid solution TW.PM(B) of polymer and wavelength converting material are stacked on the glass substrate SUB2 in that order.

In the second embodiment, the polymer PM is an acrylic resin, and the wavelength converting material which is dissolved in the polymer PM to form solid solution is a fluorescent dye which emits light in a blue frequency range by excitation due to light energy (a blue fluorescent pigment).

The second embodiment is suited to color filters for a transparent-type liquid crystal display device in which the number of particles of the B pigment PG(B) per unit volume can be made large (thick-color display).

Figure 6:
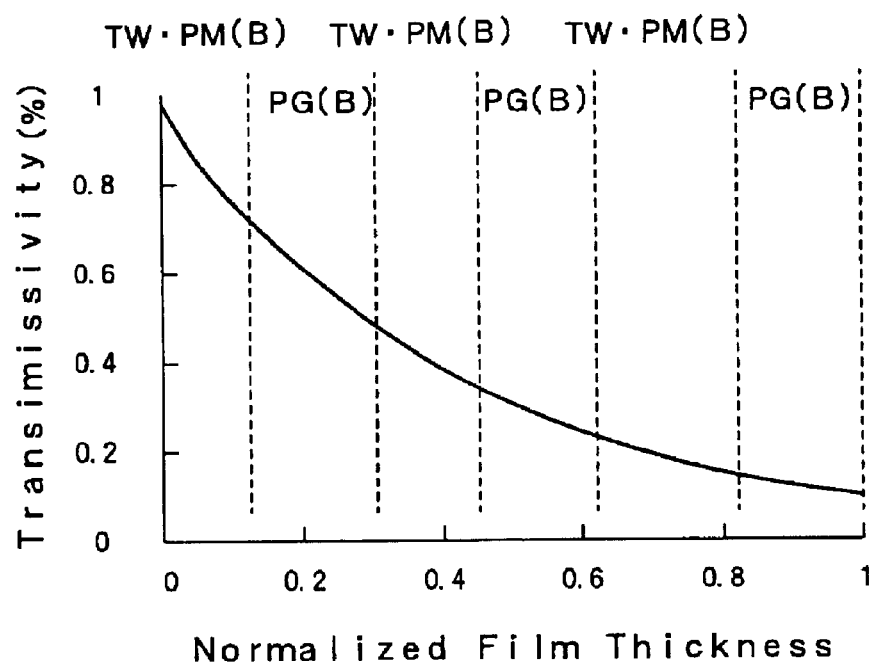
FIG. 6 is a view (graph) for explaining the relationship between the transmissivity of the color filter shown in FIG. 1 and the normalized film thickness thereof.

FIG. 6 is an explanatory view showing the relationship between the transmissivity and the normalized film thickness of the color filter shown in FIG. 4. In FIG. 4, it is assumed that the B pigment PG(B) is present in the state of being averagely dispersed in the solid solution TW.PM(B) of polymer and wavelength converting material.

In the above-described first embodiment shown in FIG. 3, the color-converting material TW(B) is dispersed in the polymer PM together with the B pigment PG(B) as the particles of the blue fluorescent pigment, so that the optical transmissivity of the color filter in the thickness direction thereof varies in a staircase-shaped manner. In the second embodiment, since the color-converting material TW(B) is dissolved to form solid solution in the solid solution TW.PM (B) of polymer and wavelength converting material, the optical transmissivity of the color filter in the thickness direction thereof continuously varies.

In the following description, reference will be made to a composite action and the advantage thereof which can be obtained in the case where the color-converting action (wavelength-converting action or frequency-converting action) of each of the color filters of the first and second embodiments of the invention and the action of each of the color filters to absorb light in a specific wavelength range are made to occur in the same filter layer at the same time.

Figure 7:
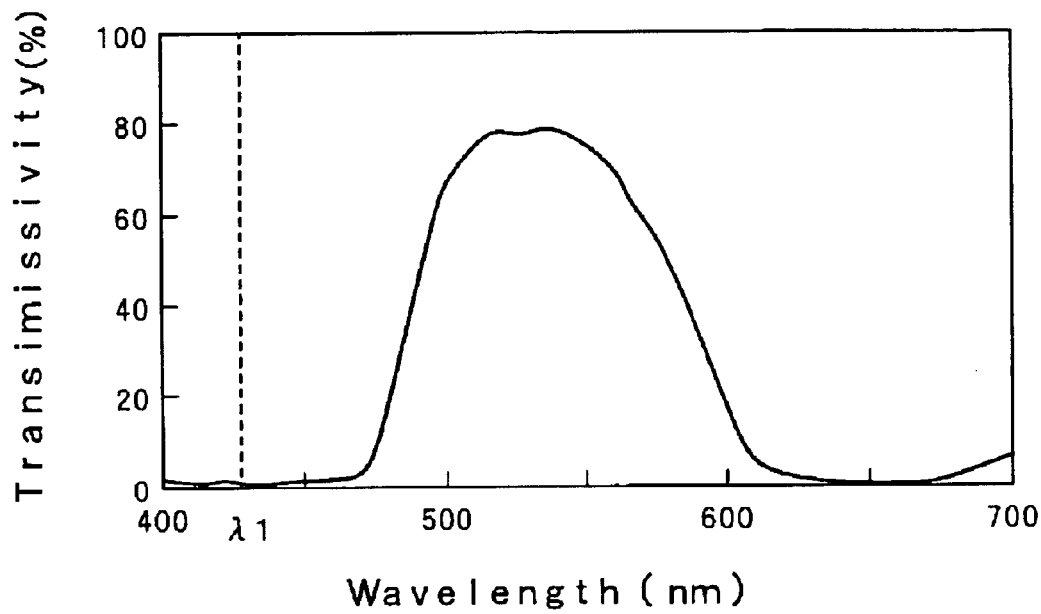
FIG. 7 is an explanatory view of a spectroscopic transmission profile for one color in a related-art color filter having no color-converting action.

FIG. 7 is an explanatory view of a spectroscopic transmission profile for one color in a related-art color filter having a color-converting action. In the following description, reference will be made to a green filter (hereinafter referred to as a G filter) by way of example. In the case where the light emitted from an illuminating device has white W, this G filter passes light in a wavelength range of approximately 490 nm to 580 nm, and absorbs light in the other wavelength range.

The relationship between transmissivity $T(\lambda)$ and absorbance $Abs(\lambda)$ in a certain wavelength $\lambda$ is expressed by the following equation:

$$Abs(\lambda)=\log(1/T(\lambda)) \quad (1)$$

If the spectroscopic characteristic of the G filter is expressed by using the absorption of light as an index, the G filter exhibits the absorption spectroscopic profile shown in FIG. 7.

The absorption of light by a material is caused by the interaction between atoms and molecules which constitute light and the material, and the absorbance $Abs(\lambda)$ is proportional to the number of atoms and the number of molecules. If the material is a film and light passes through this film, the absorbance $Abs(\lambda)$ is proportional to the film thickness t of the film. This relationship can be expressed as follows:

$$Abs(\lambda)=k(\lambda)\cdot t \quad (2)$$

where $k(\lambda)$ is a absorption constant.

From the above equations (1) and (2), the following equation can be expressed:

$$T(\lambda)=10^{-k(\lambda)\cdot t} \quad (3)$$

Figure 8:
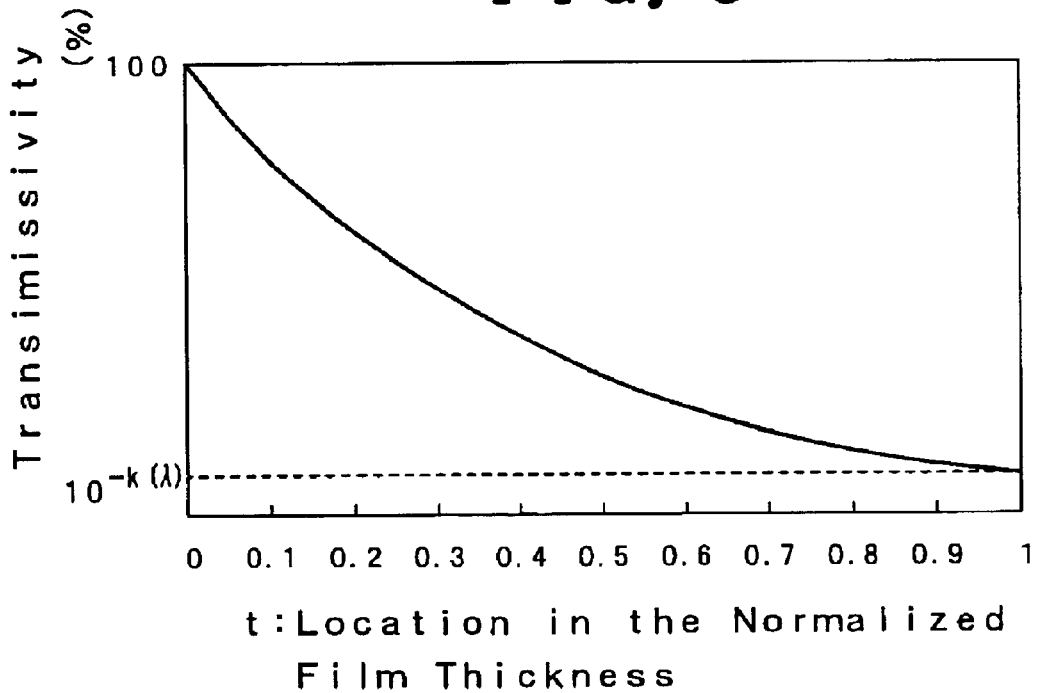
FIG. 8 is a view for explaining transmissivity, in which Equation (3) mentioned later is plotted against film thickness at a certain wavelength.

FIG. 8 is an view for explaining transmissivity, in which Equation (3) is plotted against film thickness at a certain wavelength, and shows how much light incident on the film passes through the filter at a certain film thickness position t.

As shown in FIG. 8, incident light passes through the filter at the film thickness position t at the ratio shown by Equation (3), and if this light is converted into a wavelength passing through the filter by a color-converting material present at that position, light to be absorbed by a filter having no color-converting function can pass through the filter, so that the efficiency of utilization of light can be improved.

Figure 9:
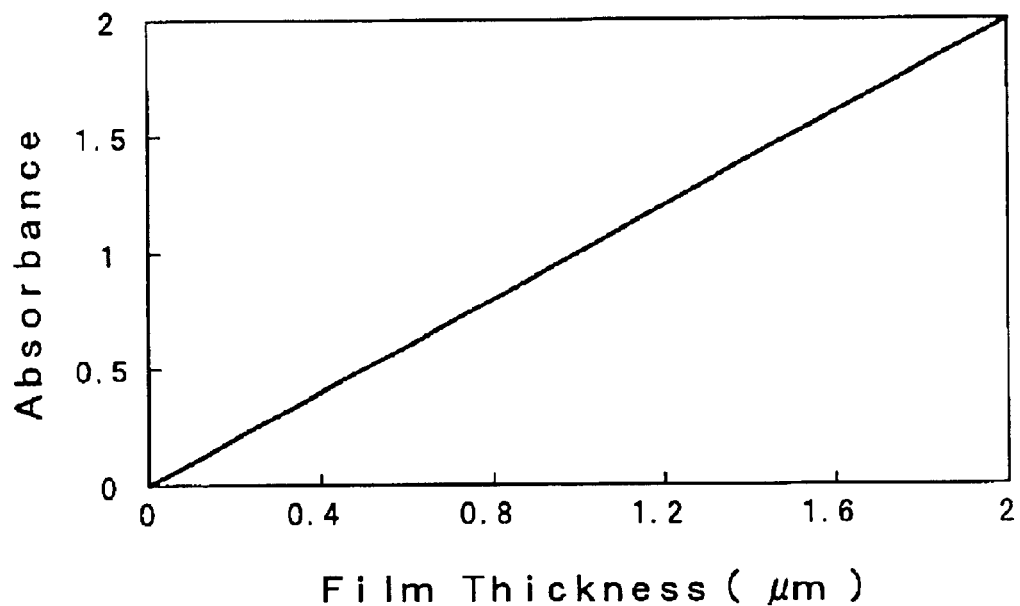
FIG. 9 is an explanatory view of the relationship between film thickness and absorbance.
Figure 10:
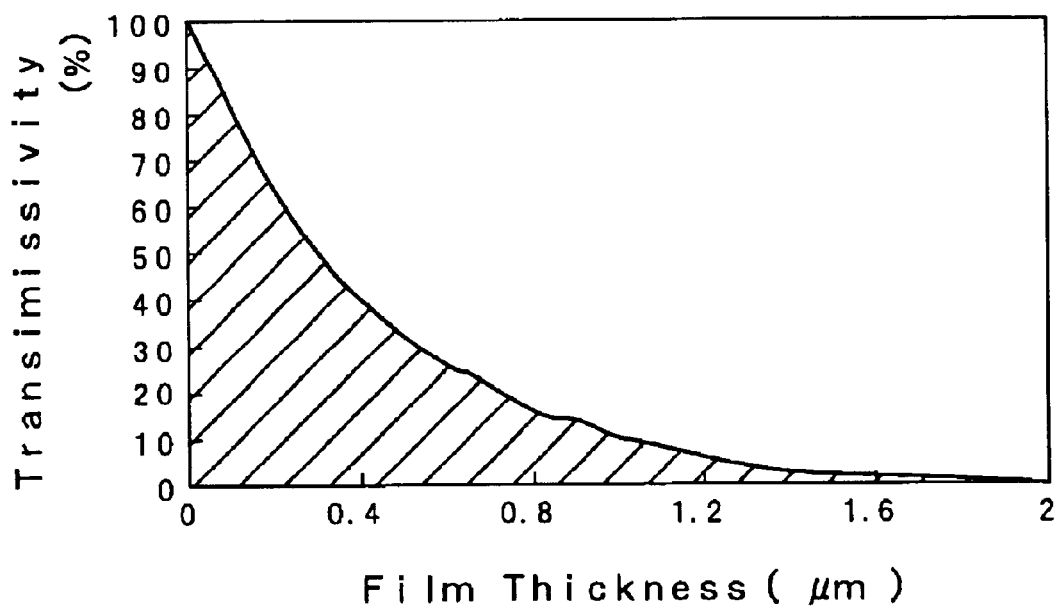

The following is a trial calculation of how much the efficiency of utilization of light can be specifically improved. FIG. 9 is an explanatory view of the relationship between film thickness and absorbance. In the case of a normal color filter, the lowest value of its transmissivity is set to 1% and the film thickness of the film is approximately 2 $\mu$m. If the relationship shown in FIG. 9 is again plotted by using these values, the relationship becomes that shown in FIG. 10. The value obtained by integrating the hatched portion of FIG. 10 represents light which can be utilized in the color-converting material, and it is seen from FIG. 10 that about 22% of incident light can be utilized.

If the setting of the minimum transmissivity of a coloring agent such as a pigment is made larger in terms of the optical absorption of the color-converting material, a far larger amount of light can be utilized.

The invention is based on the new finding that even in a color filter of the type that absorbs light, a sufficient amount of passing light is obtainable at a particular film thickness position, and the amount of passing light can be increased by a color-converting material.

As described above, in accordance with the color filter according to the second embodiment, the color filter can be easily and inexpensively obtained with a high production efficiency without decreasing color purity by using related-art manufacturing facilities and manufacturing processes without additional steps.

Figure 11:
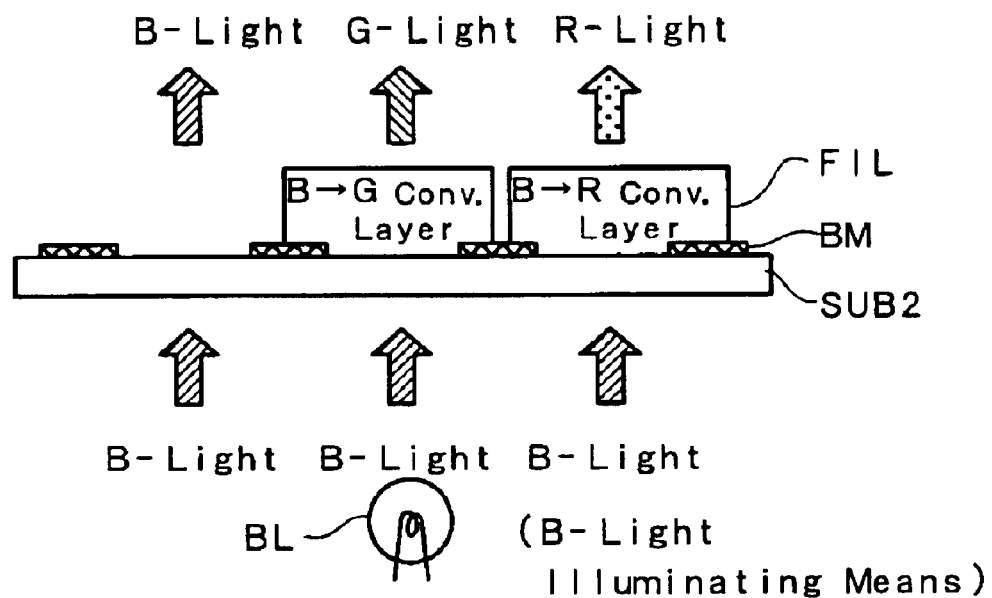
FIG. 11 is a cross-sectional view for diagrammatically explaining the construction of a third embodiment of a color filter for the liquid crystal display device according to the invention.

FIG. 11 is a cross-sectional view for diagrammatically explaining the construction of a third embodiment of a color filter for the liquid crystal display device according to the invention. This color filter FIL uses an illuminating device (backlight) BL for emitting only one primary color, and areas each having a color-converting material for absorbing light in the wavelength range emitted from this backlight BL and converting one of a plurality of primary colors in other wavelength ranges and areas having neither filter materials nor color-converting materials are arranged in the color filter FIL.

Assuming that the plurality of primary colors are three colors R, G and B, three kinds of areas are formed on the inner surface of the upper glass substrate SUB2; one is an area of a B G converting layer containing a color-converting material which converts blue light (hereinafter, B-light) into green light (hereinafter, G-light), another is an area of a B R converting layer containing a color-converting material which converts B-light into red light (hereinafter, R-light), and the other is an area having neither a filter material nor a color-converting material. A backlight BL(B) which emits only the frequency range of blue (hereinafter, B) is used as a backlight (in FIG. 14, the backlight BL(B) is shown as B-light illuminating means).

Figure 12:
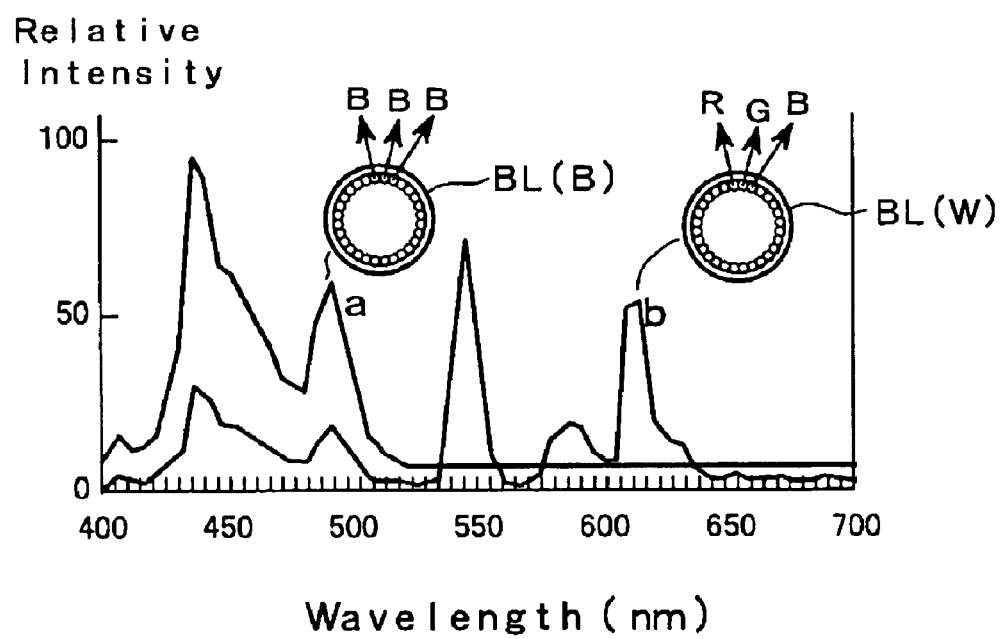
FIG. 12 is an explanatory view of spectroscopic profiles of light emitted from backlights.

FIG. 12 is an explanatory view of different spectroscopic profiles of light emitted from different backlights. In FIG. 12, a spectroscopic profile a shows the spectroscopic profile of light emitted from the B-light illuminating means BL(B), and a spectroscopic profile b shows the spectroscopic profile of light emitted from the related-art white-light (hereinafter, W-light) illuminating means described previously in connection with FIG. 3. The intensity of light emitted from the B-light illuminating means BL(B) for monochromatic radiation is greater than the intensity of B-light emitted from the W-light illuminating means, and this B-light is converted into G-light and R-light by the area of the B G converting layer and the area of the B R converting layer, respectively. Incidentally, in FIG. 12, the intensities are represented by relative values, and the maximum value of the B-light illuminating means BL(B) is 100.

Figure 13:
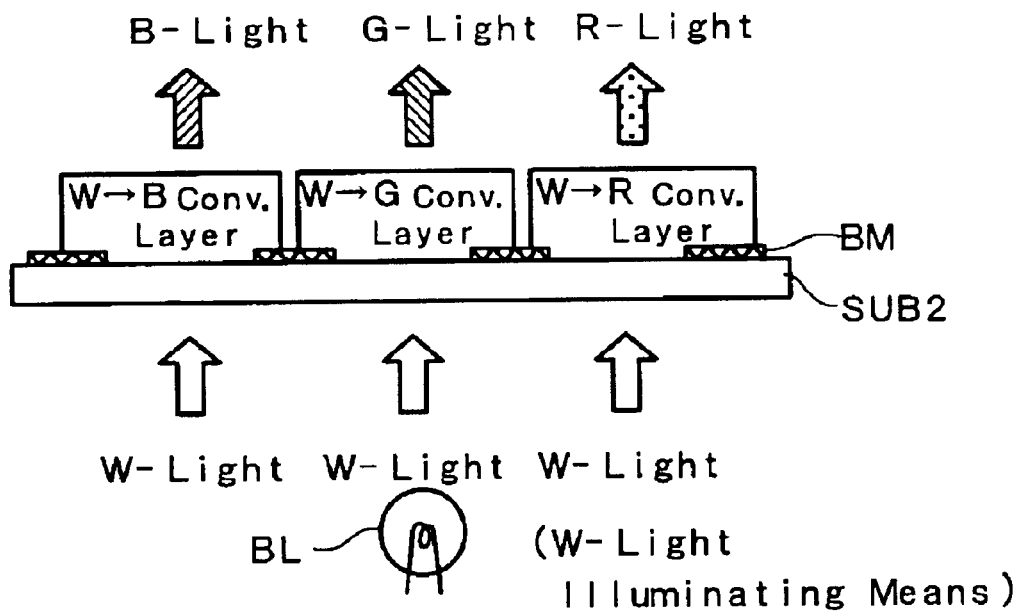
FIG. 13 is a cross-sectional view for diagrammatically explaining the construction of a fourth embodiment of a color filter for the liquid crystal display device according to the invention.

FIG. 13 is a cross-sectional view for diagrammatically explaining the construction of a fourth embodiment of a color filter for the liquid crystal display device according to the invention. This color filter FIL uses W-light illuminating means BL(W) for emitting light in a frequency range which covers all of red R, green G and blue B, and areas each having a color-converting material for absorbing light (W) in the wavelength range emitted from this backlight BL and converting one of a plurality of primary colors in other wavelength ranges are arranged in the color filter FIL.

Assuming that the plurality of primary colors are three colors R, G and B, three kinds of areas are formed on the inner surface of the upper glass substrate SUB2; one is an area of a W B converting layer containing a color-converting material which converts W-light into B-light, another is an area of a W G converting layer containing a color-converting material which converts W-light into G-light, and the other is an area of a W R converting layer containing a color-converting material which converts W-light into R-light.

Figure 14:
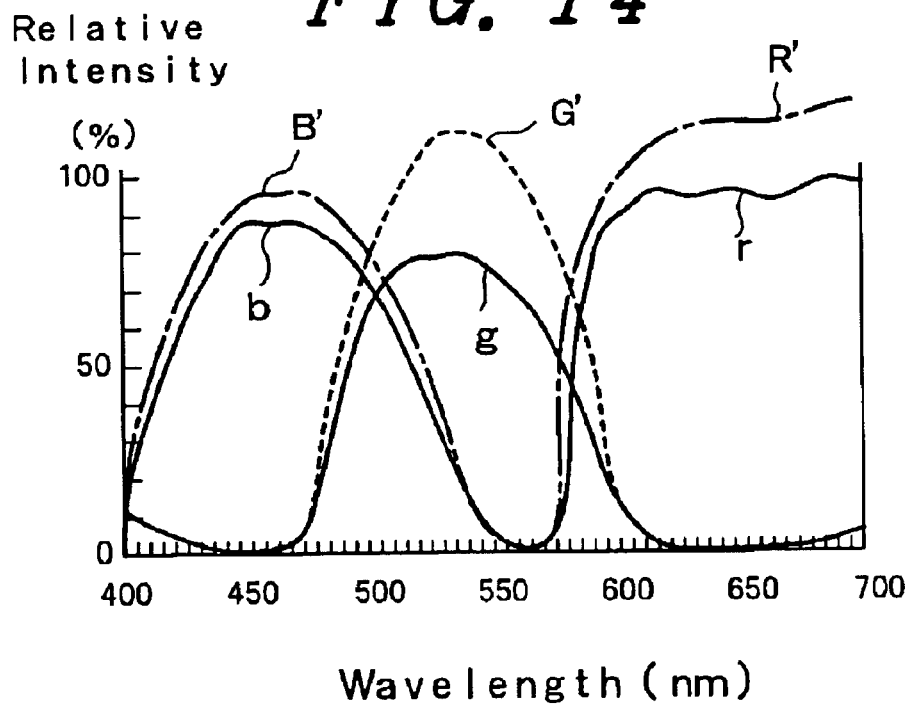
FIG. 14 is an explanatory view of the spectroscopic profiles of light passing through the color filter shown in FIG. 11 or 13.

FIG. 14 is an explanatory view of the spectroscopic profiles of light passing through the color filter shown in FIG. 11 or 13. In the case where the B-light illuminating means BL(B) is combined with the color filters shown in FIG. 11, the spectroscopic profiles of light passing through the color filter are as shown by profiles "b", "g" and "r" in FIG. 14.

In the case where the W-light illuminating means BL(W) is combined with the color filter shown in FIG. 11, G-light and R-light passing through the color filter are respectively intensified as shown by G' and R' in FIG. 14, by the area of the B G converting layer and the area of the B R converting layer. Accordingly, the brightness of the whole display is improved. In this case, B-light is converted into W-light, but since W-light serves as a luminance component which dominates the brightness of a display image, the conversion from B-light into W-light rather contributes to the improvement of the brightness.

In the case where the W-light illuminating means BL(W) is combined with the color filter shown in FIG. 13, W-light is converted into lights in different frequency ranges by the corresponding color-converting materials, and are intensified as shown by B', G' and R' in FIG. 14. Accordingly, the brightness of the whole display is improved. In this case, B-light is converted into W-light, but since W-light serves as a luminance component which dominates the brightness of a display image, the conversion from B-light into W-light rather contributes to the improvement of the brightness.

With the fourth embodiment, it is possible to obtain a display brighter than with the related art, while maintaining color purity.

Figure 15:
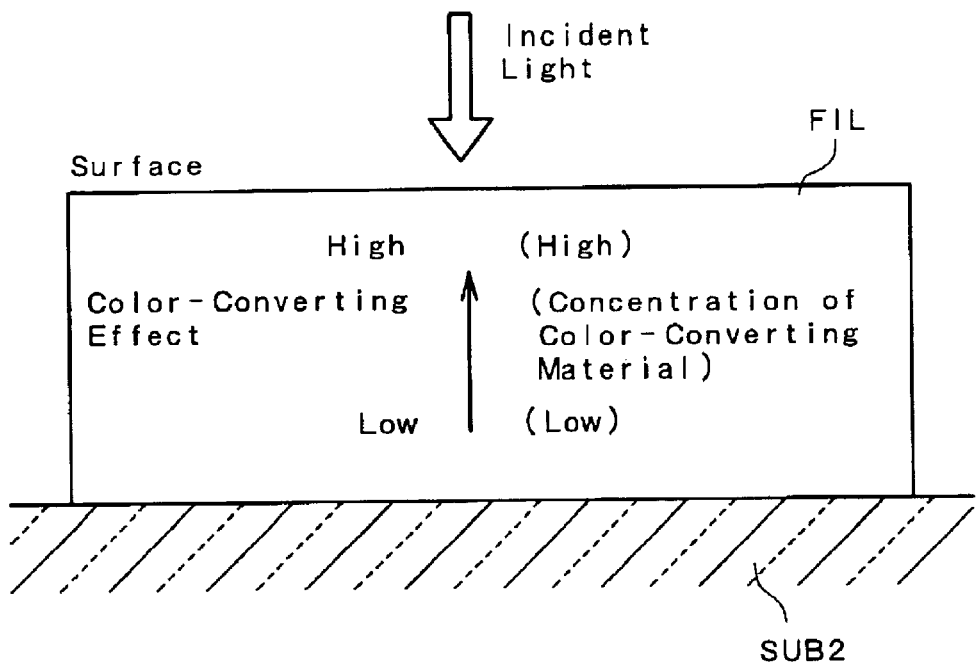
FIG. 15 is a cross-sectional view for diagrammatically explaining the construction of a fifth embodiment of a color filter for the liquid crystal display device according to the invention.
Figure 16:
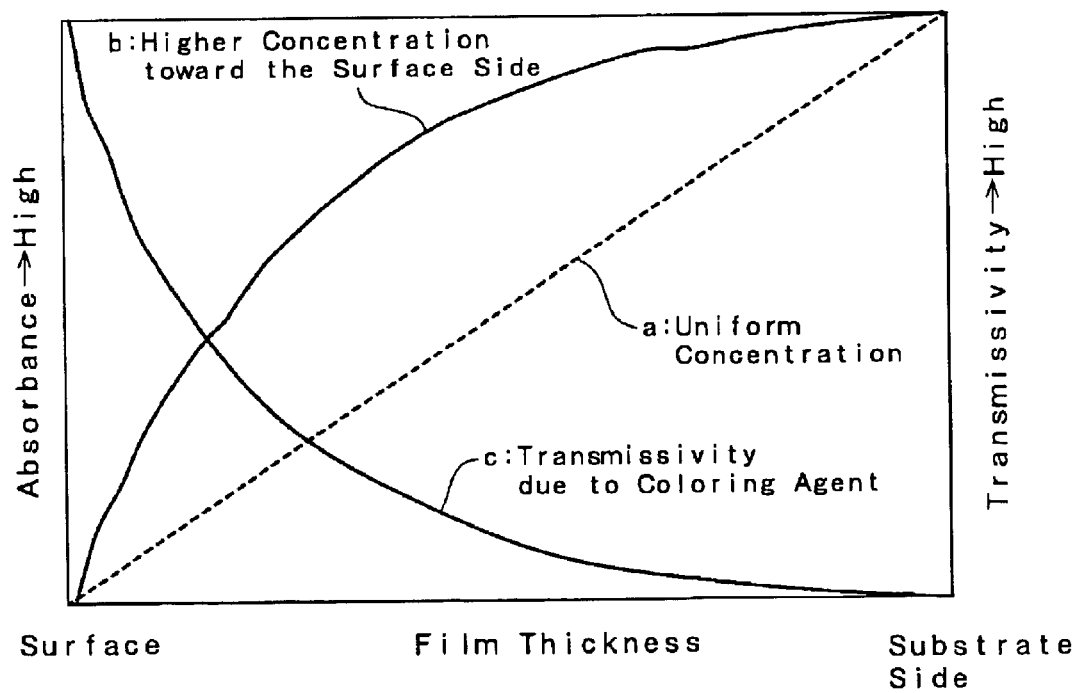
FIG. 16 is a view for explaining the effect of the fifth embodiment shown in FIG. 15, and is an explanatory view of the absorbance and the transmissivity of light due to the concentration distribution (density distribution) of a filter material.

FIG. 15 is a cross-sectional view for diagrammatically explaining the construction of a fifth embodiment of a color filter for the liquid crystal display device according to the invention. FIG. 16 is a view for explaining the effect of the fifth embodiment shown in FIG. 15, and is an explanatory view of the absorbance and the transmissivity of light due to the concentration distribution (density distribution) of a filter material, and also is an explanatory view of the optical extinction (absorbance) and the transmissivity of the filter which are obtained in the case where the concentration distribution of the color-converting material contained in the filter is made uniform, and in the case where the concentration of the color-converting material in the filter is made higher toward the light incidence side of the filter. The transmissivity of the filter becomes as shown by c in FIG. 16, and in the case where the concentration distribution of the color-converting material is made uniform, the transmissivity of the filter becomes as shown by a in FIG. 14, while in the case where the concentration of the color-converting material is made higher toward the light incidence side of the filter (higher toward the surface side), the transmissivity of the filter becomes as shown by b in FIG. 14.

In the case where the concentration of the color-converting material is made higher toward the light incidence side, the color-converting effect of the color-converting material becomes higher, whereas in the case where the concentration of the color-converting material is made higher toward the substrate side, the color-converting effect of the color-converting material becomes lower.

Out of white light (W-light) incident on the color filter, light in the wavelength range absorbed by a coloring agent (filter material) contained in the filter is wavelength-converted by the color-converting material contained in the filter that contains the filter material, thereby increasing the amount of light to be emitted from the filter. In this case, if the concentration of the color-converting material contained in the filter is made higher toward the light incidence side of the color filter in the film thickness direction thereof, the color-converting efficiency is improved.

Incidentally, the concentration distribution of the color-converting material in the color filter in the film thickness direction thereof is not limited to the continuous distribution shown in FIG. 16, and although not shown, the color filter may has a multi-layered structure made of two or more layers having different concentrations.

Figure 17:
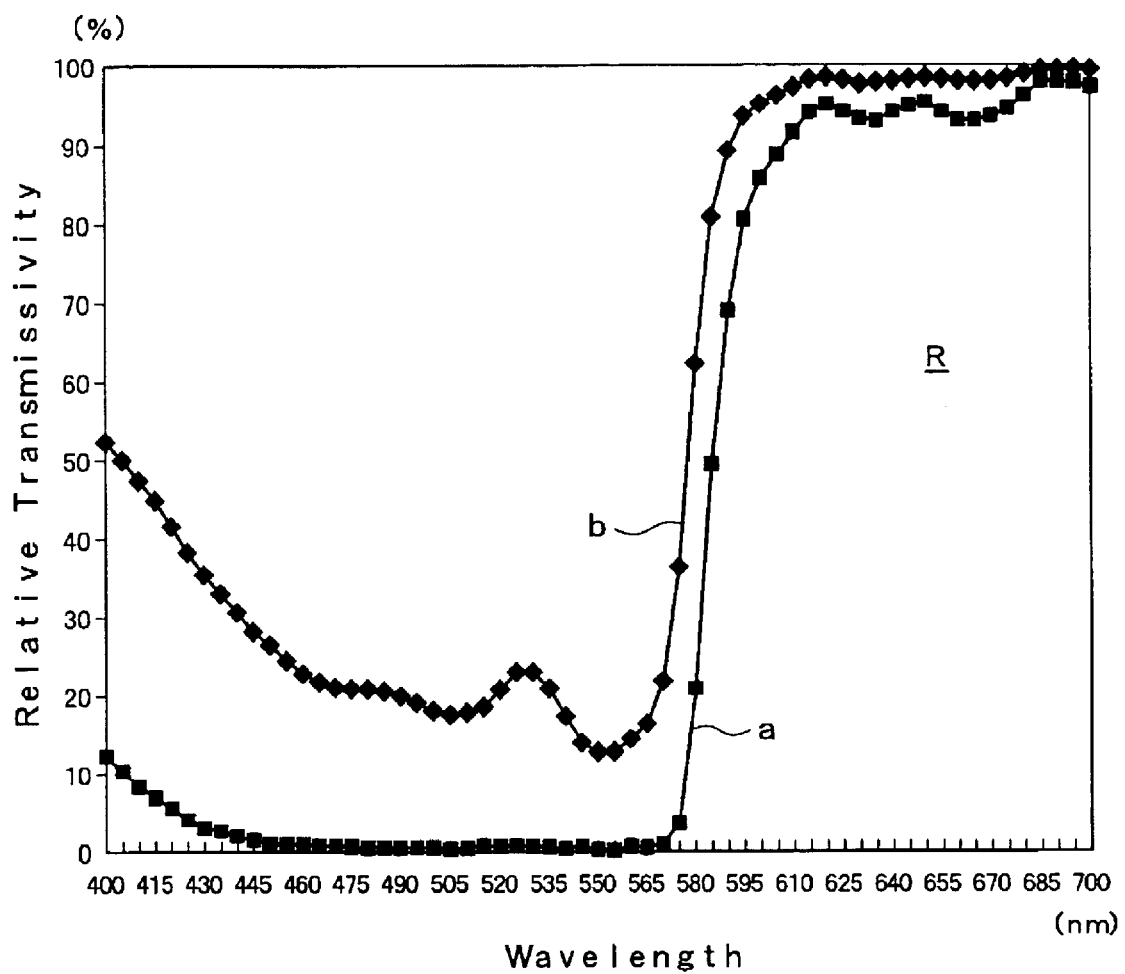
FIG. 17 is an explanatory view of the range of setting of the transmissivity of a color filter in which a filter material which passes light in a specific wavelength range and a color-converting material which converts incident light into light in a specific wavelength range are contained in the same layer.

FIG. 17 is an explanatory view of the range of setting of the transmissivity of a color filter in which a filter material which passes light in a specific wavelength range and a color-converting material which converts incident light into light in a specific wavelength range are contained in the same layer. In the following description, reference will be made to R-light. In FIG. 17, a curve "a" denotes the case of a transparent-type color filter, while a curve "b" denotes a reflection-type color filter.

In the case of the transparent-type color filter, the minimum transmissivities of the other color lights (in this example, B-light and G-light) of the filter material are set in the range of 0% to about 10%. In other words, the other color lights hardly pass through the color filter.

Contrarily, in the case of the reflection-type color filter, transmissivity is, as a whole, made higher than in the case of the transparent-type color filter, thereby ensuring brightness. The range of transmissivity is about 10% or more and about 50% or less.

Figure 18:
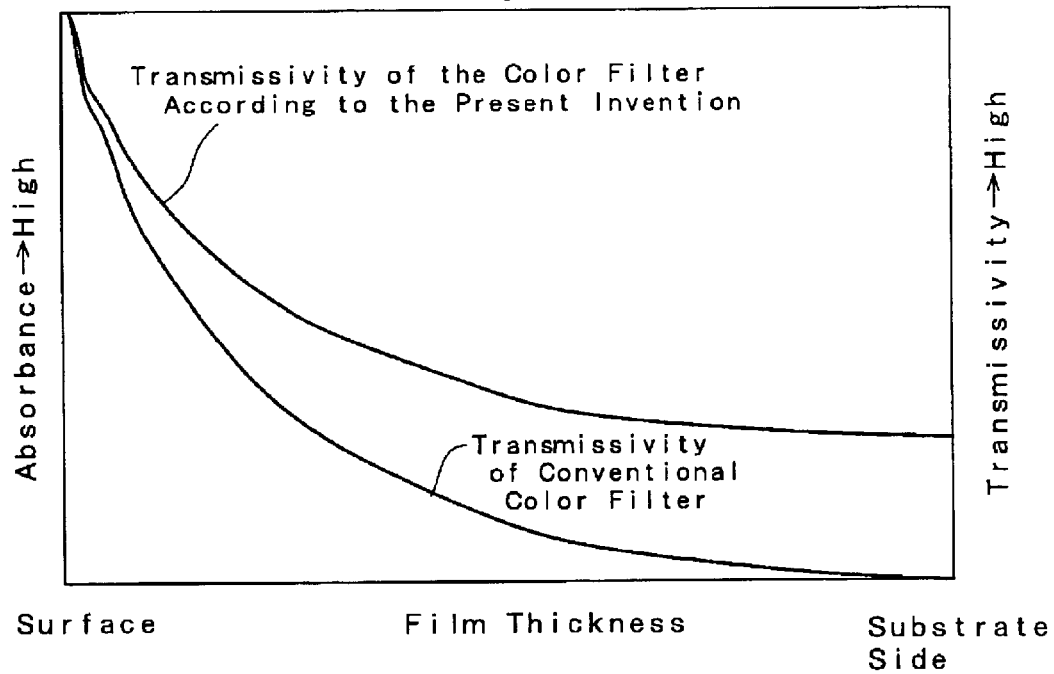
FIG. 18 is an explanatory view of absorbance and transmissivity, showing the comparison between the effect of the color filter of the fifth embodiment and that of a related-art color filter.

FIG. 18 is an explanatory view of absorbance and transmissivity, showing the comparison between the effect of the color filter of the fifth embodiment and that of a related-art color filter. As shown in FIG. 18, the absorbance and the transmissivity of the color filter of the fifth embodiment are, as a whole, higher than those of the related-art color filter. Accordingly, the fifth embodiment can provide a bright display.

The outline of a manufacturing process for a liquid crystal display device using the color filter according to the above-described fifth embodiment.

First of all, in a manner similar to the process of forming known thin film transistors, deposition and patterning are repeated to form thin film transistors made of amorphous silicon, storage capacitors, pixel electrodes, source electrodes and counter electrodes on a glass substrate which is 0.7 mm or 1.1 mm thick and is used as one substrate.

Then, a plurality of video signal lines (drain lines), drain electrodes and counter voltage signal lines for applying predetermined voltages to the aforesaid electrodes via the thin film transistors as well as a plurality of scanning signal lines (gate lines) and gate electrodes for controlling the electric conduction of the thin film transistors are formed to fabricate an active matrix substrate.

The thin film transistors, the electrodes and the lines are covered with an insulating film and a protective film. After that, an alignment film material is coated and calcinated, and a liquid crystal alignment control function is imparted to the alignment film by rubbing treatment.

In addition, a photosensitive black resist is coated onto a glass substrate which is 0.7 mm or 1.1 mm and is used as a color filter substrate constituting the other substrate, and the photosensitive black resist is exposed by using an exposure mask having a predetermined pattern and the exposed resist is developed and calcinated to form a black matrix.

Then, photosensitive resin resists of red (R), green (G) and blue (B) in each of a color-converting material is disposed or dissolved to form solid solution are used to form colored layers (filter layers, or filter) by repeating a photo lithography process similar to the above-described process, i.e., exposure, development and calcination, whereby a color filter made of an arrangement of filters for three colors is formed.

In addition to the above-described method, this filter can be formed by using an existing method such as an intaglio printing method, an inkjet transferring method or a dispensing coating method.

As required, a transparent ultraviolet-setting (ultraviolet-curing) resin or thermosetting resin is coated on the entire upper surface of the color filter, and is irradiated with ultraviolet rays or heated to form a protective film which protects and levels the color filter layers. In addition, beads or column-shaped spacers which make uniform the gap between the active matrix substrate and the color filter substrate may also be formed as required.

The active matrix substrate and the color filter substrate which have been fabricated in the above-described manner are disposed in opposition to each other, and their peripheral portions except a liquid crystal filling port are secured to each other by an adhesive. After a liquid crystal has been sealed between the two substrates, the liquid crystal filling port is sealed.

Figure 19:
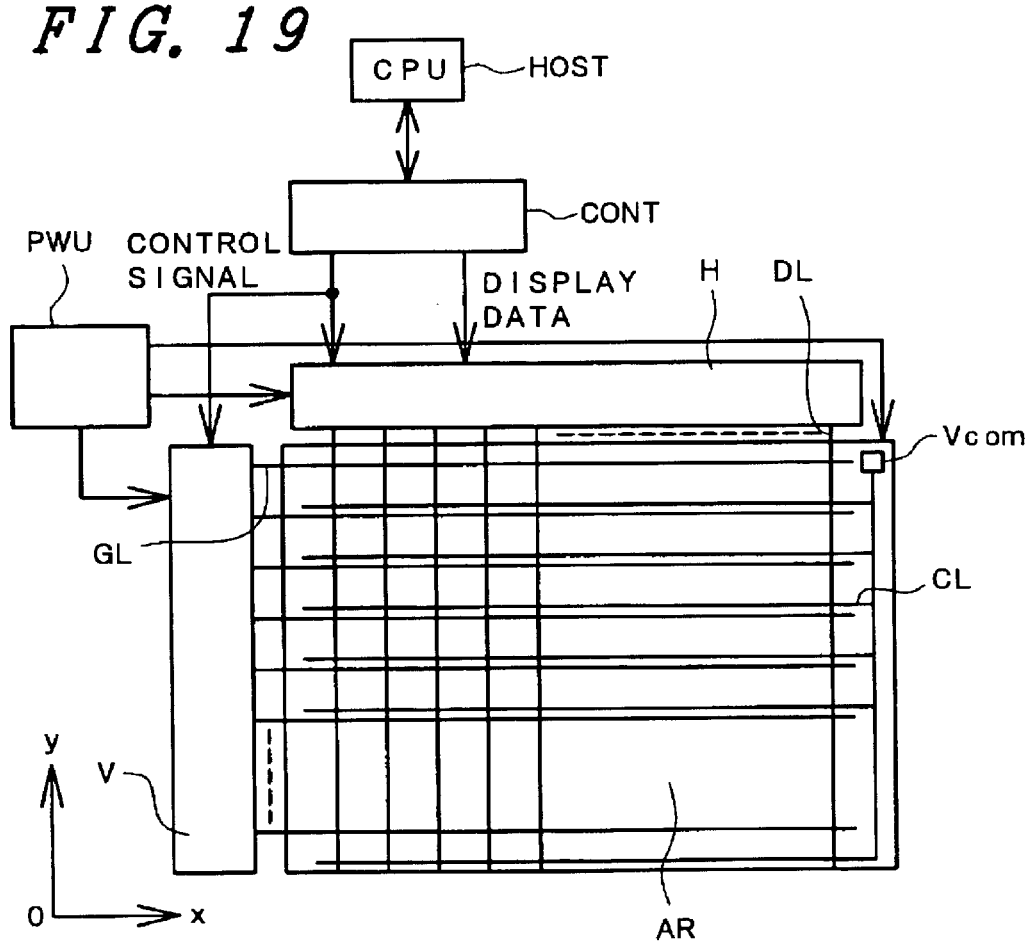
FIG. 19 is a diagrammatic view for explaining one example of driving means of the liquid crystal display device according to the invention.

FIG. 19 is a diagrammatic view for explaining one example of driving means of a liquid crystal display device according to the invention. In an effective pixel area AR of an active matrix substrate which serves as a liquid crystal display substrate, gate signal lines GL and counter voltage signal lines (common lines) CL are formed to be extended in the x-direction (row direction) and to be juxtaposed in the y-direction (column direction) as viewed in FIG. 19, with each of the gate signal lines GL being insulated from an adjacent one of the counter voltage signal lines CL.

A unit pixel is formed in each of rectangular areas surrounded by the gate lines GL, the counter voltage signal lines CL and the drain lines DL.

The liquid crystal display device is provided with a vertical scanning circuit V and a video signal driver circuit H as its external circuits. Scanning signals (voltages) are sequentially supplied to the respective gate lines GL by the vertical scanning circuit V, and video signals (voltages) are supplied to the respective drain lines DL from the video signal driver circuit H in accordance with the timing of supply of the scanning signals.

Incidentally, the vertical scanning circuit V and the video signal driver circuit H are supplied with electric power from a liquid crystal driving power source PWU, and a controller CONT divides the image information inputted from a host CPU into display data and a control signal, and inputs them to the vertical scanning circuit V and the video signal driver circuit H. Counter voltage signals are applied to the counter voltage signal lines CL from the liquid crystal driving power source PWU via a terminal Vcom.

FIGS. 20A to 20F are diagrams of driving waveforms of the liquid crystal display device according to the invention. The counter voltage is formed as an alternating rectangular pulse wave having two values VCH and VCL, and the non-selecting voltage of each of scanning signals VG(i-1) and VG(i) is varied between the two values VCH and VCL every scanning period. The amplitude width of the counter voltage and that of the non-selecting voltage are made the same.

The video signal voltage is a voltage obtained by subtracting ½ of the amplitude of the counter voltage from a voltage to be applied to the liquid crystal layer.

The counter voltage may also be a direct current voltage, but by alternating the video signal voltage, it is possible to decrease the maximum amplitude of the video signal voltage and therefore, it is possible to use a circuit having a low breakdown voltage as the video signal driver circuit (signal-side driver).

Unlike a vertical electric field (TN) type of liquid crystal display device in which an electric field is applied perpendicularly to the surfaces of its substrates, in the in-plane-switching (IPS) type of liquid crystal display device in which an electric field is applied to its liquid crystal in parallel with the surfaces of its substrates, since there are almost no capacitances (so-called liquid crystal capacitances) constituted by pixel electrodes and counter electrodes, a storage capacitance Cstg is disposed in each pixel.

When a thin film transistor TFT is switched, this storage capacitance Cstg also works to decrease the influence of a gate potential variation $\Delta Vg$ on a pixel electrode potential Vs. This manner is expressed by the following equation:

$$\Delta Vs = [Cgs/(Cgs+Cstg+Cpix)] \times \Delta Vg.$$

In this equation, Cgs represents a parasitic capacitance formed between a gate electrode GT and a source electrode SDI of the thin film transistor TFT, Cpix represents a capacitance formed between a pixel electrode PX and a counter electrode CT, and $\Delta Vs$ represents a variation in the pixel electrode potential due to $\Delta Vg$, i.e., a so-called feedthrough voltage.

This variation $\Delta Vs$ becomes a cause of a direct current component which is applied to the liquid crystal LC, but as the storage capacitance Cstg is made larger, the value of the variation $\Delta Vs$ can be made smaller.

A decrease in the direct current component which is applied to the liquid crystal LC improves the life of the liquid crystal LC, and can reduce a so-called burning phenomenon in which when a display picture is switched, part of the previous picture is left.

Figure 21:
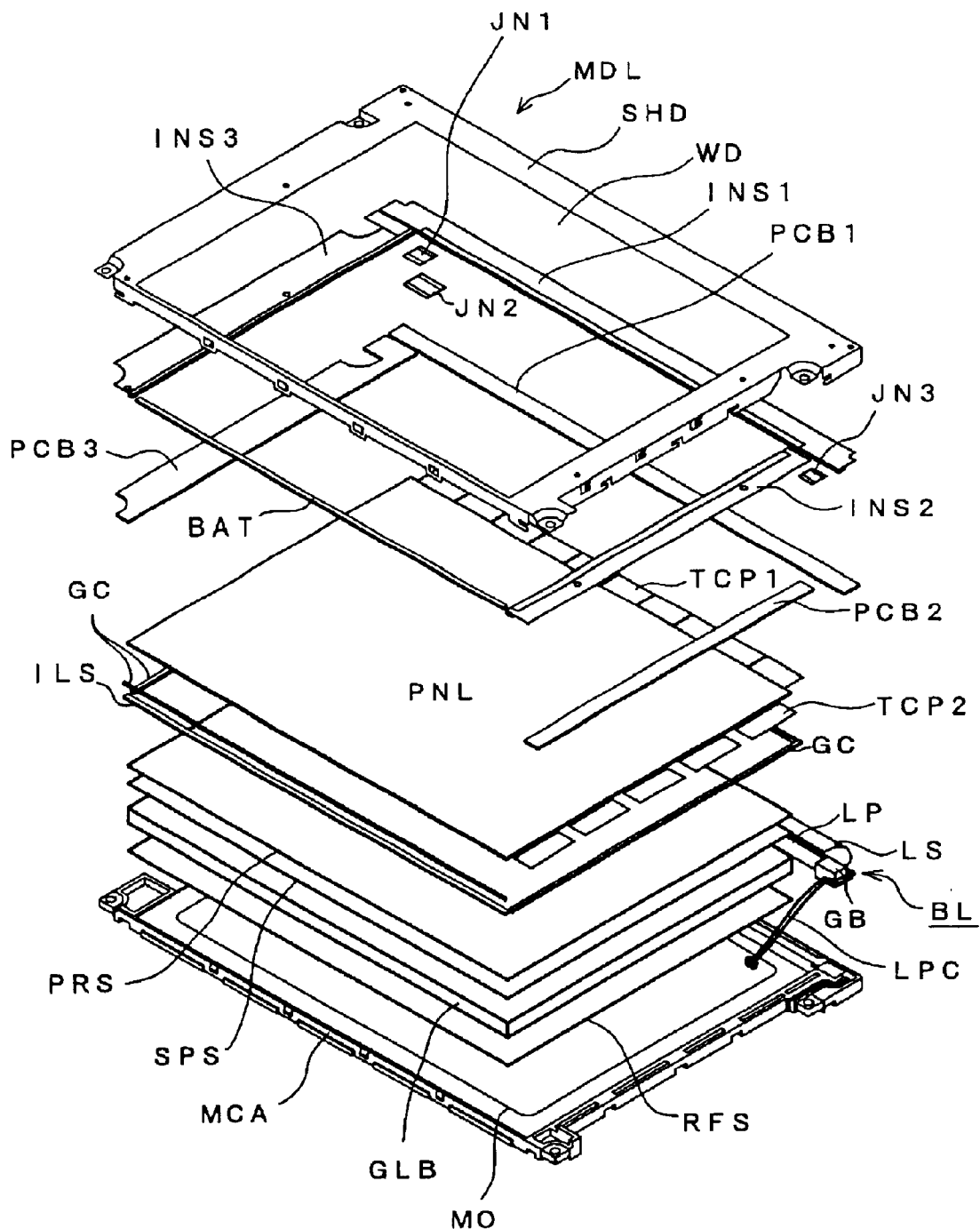
FIG. 21 is a developed perspective view illustrating individual constituent parts of a liquid crystal display device.

FIG. 21 is a developed perspective view illustrating individual constituent parts of a liquid crystal display device. In FIG. 21, symbol SHD denotes a frame-shaped shield case (metal frame) formed of a metal sheet, symbol WD denotes a display window, symbol PNL denotes a liquid crystal display panel, symbol SPS denotes an optical diffusion sheet, symbol GLB denotes a light guide, symbol RFS denotes a reflecting sheet, symbol BL denotes a fluorescent tube for a backlight, and symbol MCA denotes a lower case (backlight case). These individual members are stacked in the arrangement shown in FIG. 21 to assemble the liquid crystal display device as a module MDL.

The module MDL is constructed so that all the members are fixed by claws and hooks disposed on the shield case SHD. A case MD is formed by joining the module MDL and the backlight case MCA to each other.

The backlight case MCA has a shape which accommodates the backlight fluorescent tube BL, the optical diffusion sheet SPS, the light guide GLB and the reflecting sheet RFS. Light of the backlight fluorescent tube BL which is disposed on one side of the light guide GLB is formed into backlight which becomes uniform on the display screen, by the light guide GLB, the reflecting sheet RFS and the optical diffusion sheet SPS, and the backlight is made to exit toward the liquid crystal display panel PNL.

An inverter circuit board is connected to the backlight fluorescent tube BL, and serves as the power source of the backlight fluorescent tube BL.

Incidentally, the invention is not limited to the in-plane-switching type of liquid crystal display device, and can similarly be applied to a vertical electric field type of liquid crystal display device, another active matrix type of liquid crystal display device, and a simple matrix type of liquid crystal display device.

Figure 22:
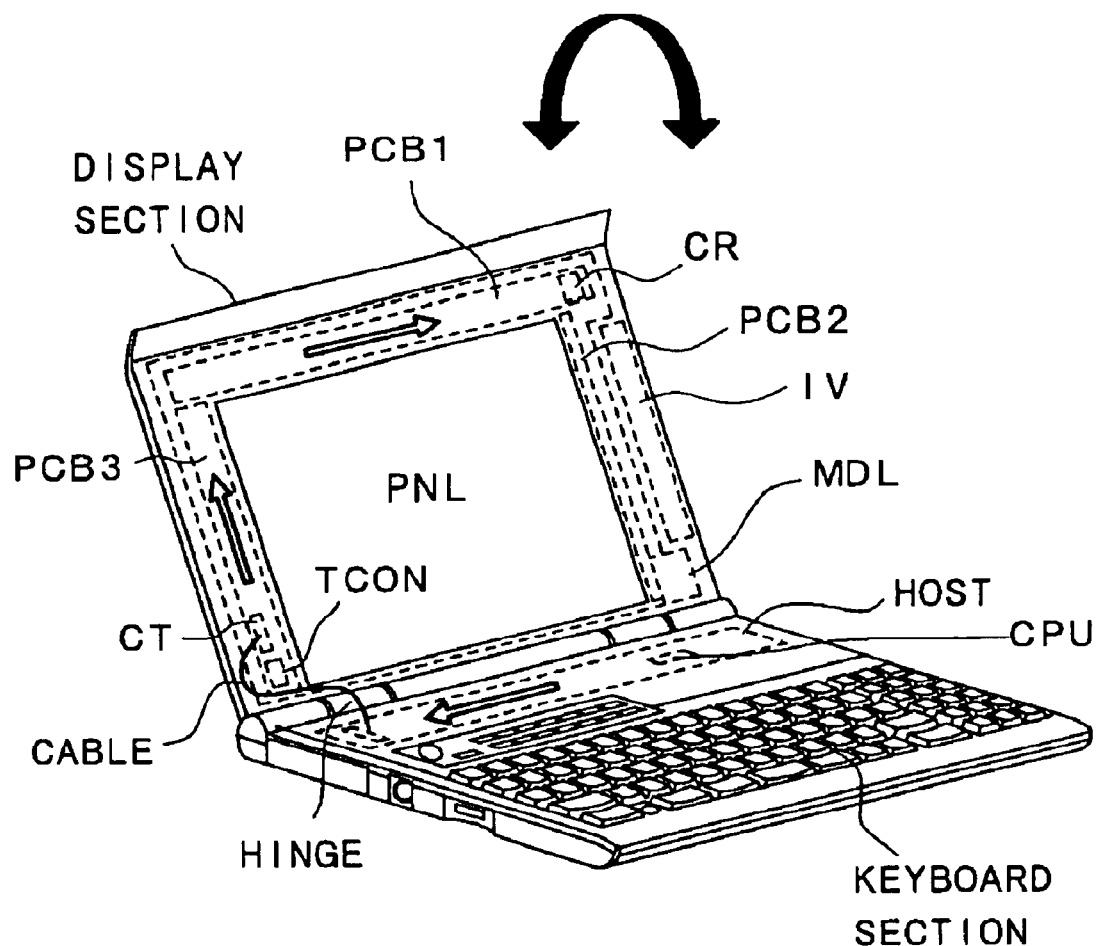
FIG. 22 is a perspective view of a notebook type computer, for explaining one example to which a liquid crystal display device according to the invention is applied.

FIG. 22 is a perspective view of a notebook type computer, for explaining one example to which a liquid crystal display device according to the invention is applied. This notebook type computer (portable personal computer) is made of a keyboard section (main-frame section) and a display section which is joined to the keyboard section by a hinge. A liquid crystal display module includes driver circuit boards PCB1 and PCB2, a driver circuit board PCB3 provided with a control chip TCON, and a backlight all of which are integrated at the periphery of the liquid crystal display panel PNL, and the liquid crystal display module and an inverter power source board IV which is the power source of the backlight are mounted in a case of the display section.

The liquid crystal display device has a color filter structure according to any of the above-described embodiments, and is capable of displaying a high-quality image which is improved in color purity and brightness.

Figure 23:
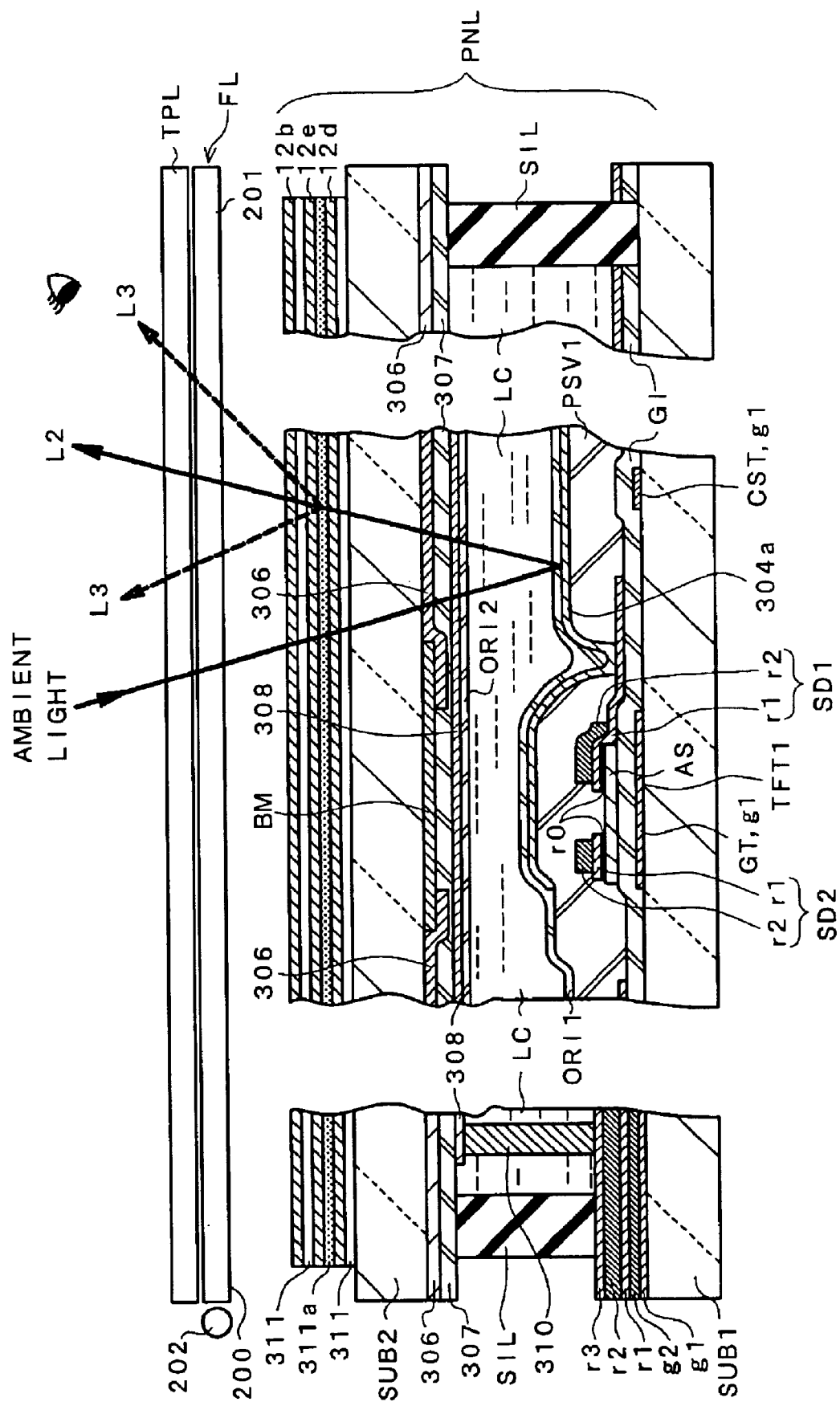
FIG. 23 is a cross-sectional view of a second example in which a liquid crystal display device according to the invention is mounted.

FIG. 23 is a cross-sectional view of a second example in which a liquid crystal display device according to the invention is mounted. In the second example, an illuminating device FL is stacked on a liquid crystal display device PNL, and a touch panel TPL is disposed on the illuminating device FL to constitute a touch-screen type of liquid crystal display device.

The liquid crystal display device PNL is a TN-type thin film transistor (TFT) type of liquid crystal panel which is a typical active matrix type. In the liquid crystal display device PNL, a plurality of pixels each having a thin film transistor TFT1 and a pixel electrode 304a are formed over the inside surface of a thin film transistor substrate SUB1.

Each of the pixels is disposed within an area of intersection of adjacent two scanning signal lines and adjacent two video signal lines. The thin film transistor TFT1 includes a first semiconductor layer (channel layer) As which overlies the thin film transistor substrate SUB1, a second semiconductor layer (a semiconductor layer which contains impurities) r0 which overlies the first semiconductor layer As, and a source electrode SD1 and a drain electrode SD2 which overlie the second semiconductor layer r0. In this example, each of the source electrode SD1 and the drain electrode SD2 is formed by a multi-layered film made of conductive films r1 and r2, but may also be formed by a single layer using only the conductive film r1.

Incidentally, according to the manner of application of voltage, the relationship between a source electrode and a drain electrode is inverted so that the electrode SD2 becomes a source electrode and the electrode SD1 becomes a drain electrode, but in the following description, the respective electrodes SD1 and SD2 will be referred to as the source electrode and the drain electrode for the sake of convenience.

Reference numeral PSV1 denotes an insulating film (protective film) which protects the thin film transistor TFT1, reference numeral 304a denotes a pixel electrode, reference numerals ORI1 and ORI2 denote alignment films which respectively align the sides of a liquid crystal LC that are in contact with the thin film transistor substrate SUB1 and the color filter substrate SUB2, and reference numeral 308 denotes an upper electrode (common electrode).

Reference numeral BM denotes a black matrix (light shielding film) which has the function of shielding the portion between the pixel electrode 304a and an adjacent pixel electrode from light and improving contrast. Symbol 310 denotes a conductive film which electrically connects the upper electrode 308 and a terminal (a conductive film made of multiple layers of metals g1, g2, r1, r2 and r3) provided on a first substrate 301.

Similarly to an insulated-gate type of field effect transistor, when a selecting voltage is applied to the gate electrode GT of the thin film transistor TFT1, the portion between the source electrode SD1 and the drain electrode SD2 conducts electrically and the thin film transistor TFT1 functions as a switch.

The pixel electrode 304a is connected to the source electrode SD1, a drain line (video signal line) is connected to the drain electrode SD2, and a gate line (scanning signal line) is connected to the gate electrode GT, whereby the particular pixel electrode 304a is selected by a selecting voltage applied to the scanning signal line and a gray scale voltage applied to the video signal line is supplied to the particular pixel electrode 304a. Symbol Cst denotes a charge-holding capacitance formed of the conductive film g1, and has the function of holding the gray scale voltage supplied to the pixel electrode 304a until the next selection period.

This kind of active matrix type of liquid crystal display device PNL has a number of features: for example, since a switching element such as a thin film transistor is provided in each pixel, there is no problem that crosstalk occurs between different pixels, and there is no need to restrain crosstalk by special driving such as a voltage averaging method; it is possible to readily realize a multiple gray scale display; and even if the number of scanning lines are increased, contrast does not lower.

In this example, the pixel electrode 304a is made of a reflective metal film such as aluminum, chromium, titanium, tantalum, molybdenum or silver. In addition, since the protective film PSV1 is provided between the pixel electrode 304a and the thin film transistor TFT1, even if the pixel electrode 304a is made large to overlap the thin film transistor TFT1, no malfunction occurs at all, whereby it is possible to realize a liquid crystal display device having high reflectance.

Figure 24:
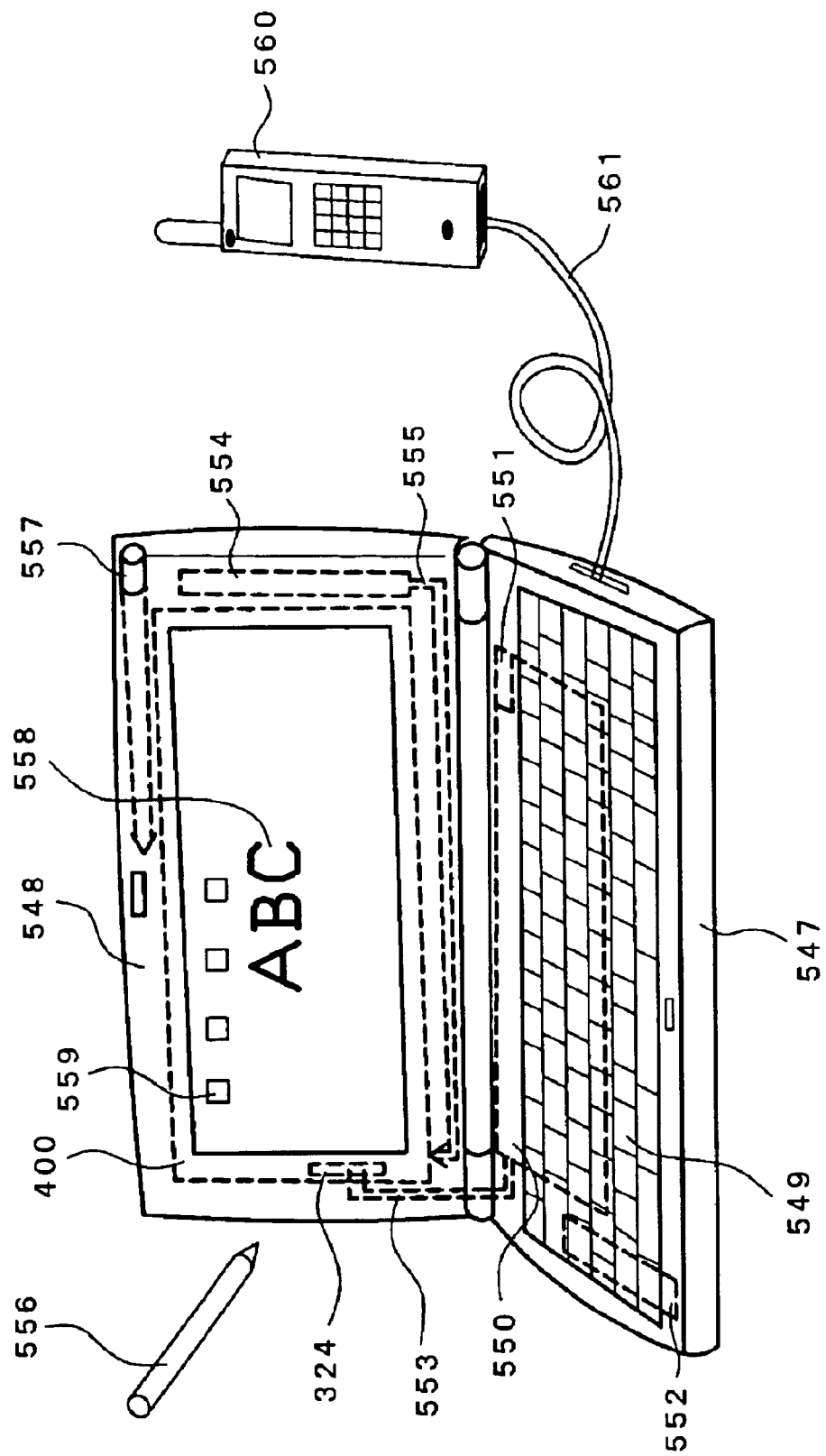
FIG. 24 is an explanatory view of one example of an information processing apparatus in which the liquid crystal display device shown in FIG. 23 is mounted.
Figure 25:
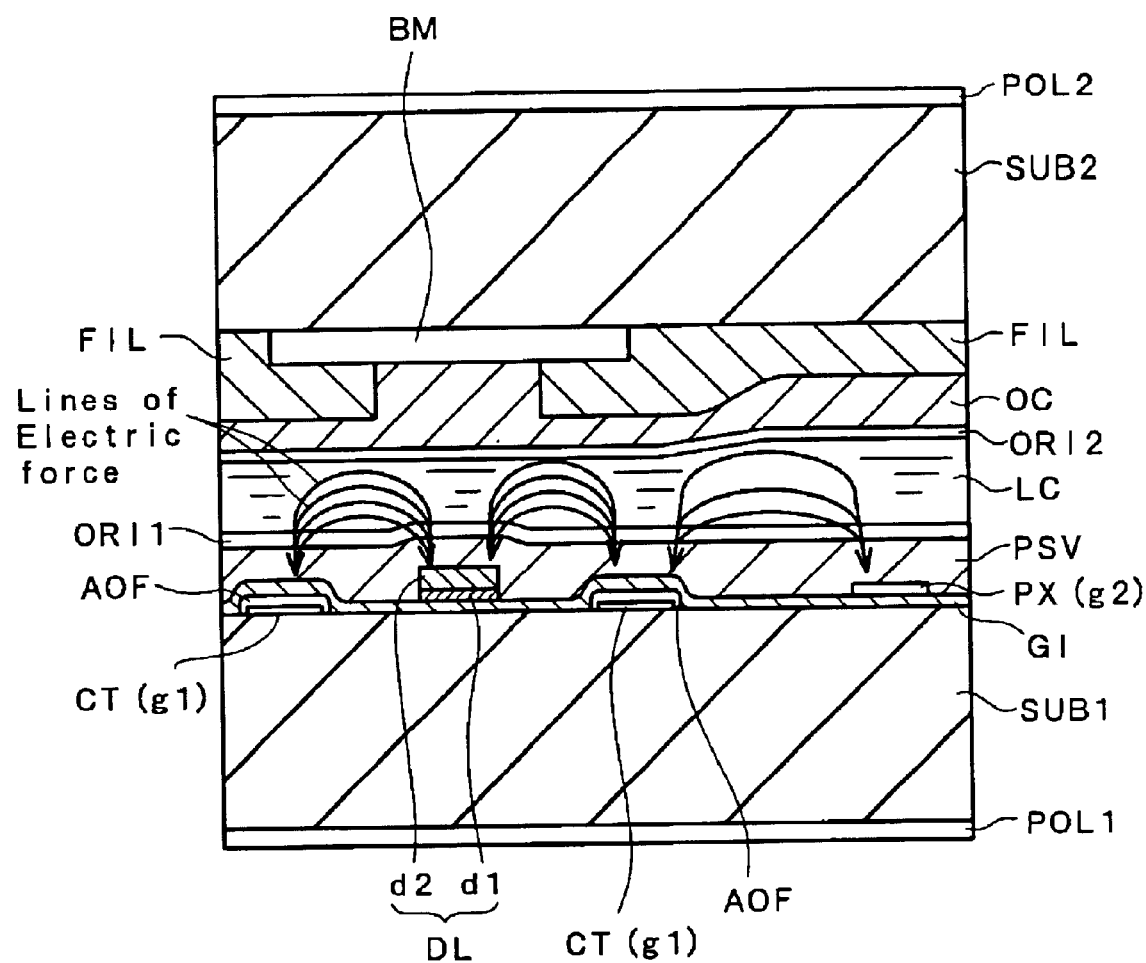
FIG. 25 is a diagrammatic cross-sectional view for schematically explaining electric fields for pixel formation in an in-plane-switching type of liquid crystal display device.
Figure 26:
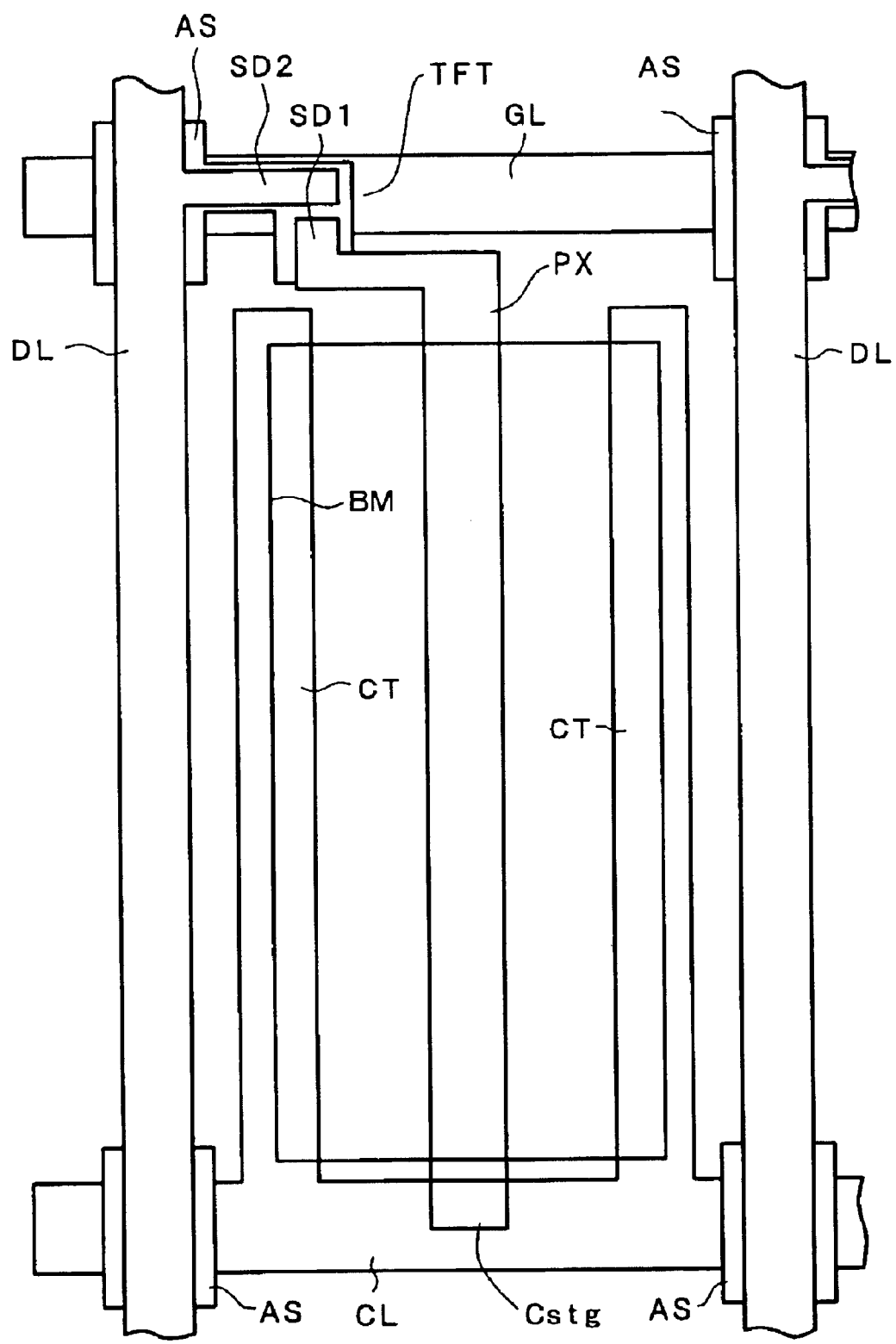
FIG. 26 is a plan view for schematically explaining the construction of one pixel and the vicinity thereof on the lower substrate shown in FIG. 25.
Figure 27:
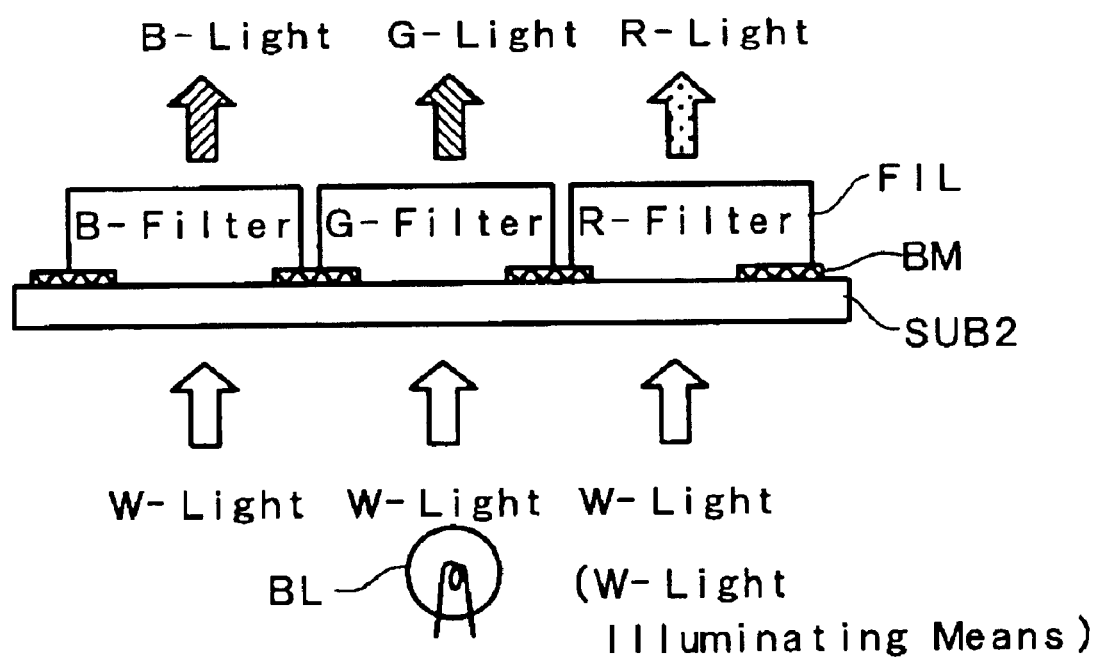
FIG. 27 is a diagrammatic view for explaining an example of the construction of related-art color filters.

FIG. 24 is an explanatory view of one example of an information processing apparatus in which the liquid crystal display device shown in FIG. 23 is mounted. This information processing apparatus is also called a mobile information terminal, and is composed of a main-frame section 547 and a display section 548. The main-frame section 547 has a keyboard 549, a host (information processing section) 550 having a microcomputer 551, and a battery 552.

The display section 548 is provided with a pressure input type of liquid crystal display device 400, and a user inputs a character or FIG. 558 to a touch panel exposed in the display section 548 or selects an icon 559 displayed in the display section 548, by means of a pen 556 housed in a pen housing portion 557.

In addition, the display section 548 is provided with an inverter power source 554 for supplying lighting power to an auxiliary light source (luminaire) via a cable 555.

Signals and voltages for display which are outputted from the main-frame section 547 are supplied via an interface cable 553 to an interface connector 324 of the liquid crystal panel which constitutes a liquid crystal display device 400 mounted in the display section 548.

In addition, this information processing apparatus can be connected to a mobile telephone 560 via a cable 561, so that communication is enabled with the information processing apparatus being connected to an information communication network such as the Internet. A liquid crystal display device using color filters according to the invention can also be used in the display section of this mobile telephone 560.

In this manner, by using the liquid crystal display device according to the invention, the information processing apparatus is reduced in size and weight, whereby the operability thereof can be improved.

Incidentally, the shape and the structure of this kind of mobile information terminal are not limited to the shown examples, and the invention can be applied to mobile information terminals provided with various other shapes, structures and functions.

As is apparent from the foregoing description, the liquid crystal display device according to the invention is provided with a color filter which has in the same layer of polymer PM a color-converting material converting part of incident light into light in a specific wavelength range, and a filter material which is a coloring agent passing the light in the specific wavelength range. Accordingly, it is possible to provide a liquid crystal display device which is improved in the efficiency of utilization of light and is of high brightness and lower power consumption.

In addition, since the color filter is fabricated by forming the color-converting material and the filter material at the same time, it is not necessary to add steps to an existing manufacturing process.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
   a liquid crystal panel; and
   color filters being provided at the liquid crystal panel,
   wherein at least one of the color filters comprises a polymer layer including a color-converting material converting an incident light thereof into a light in a specific wavelength range and a filter material passing the light in the specific wavelength range,
   density of the color-converting material in the polymer layer is higher at a light-incidence side of the polymer layer than an opposite side thereof,
   density of the filter material is higher at the opposite side of the polymer layer than the light-incidence side thereof, and
   the filter material is formed of pigments, and the color-converting material is formed of fluorescent particles having averaged particle size of which is not greater than that of the filter material.

2. A liquid crystal display device comprising:
   a liquid crystal panel; and
   color filters being provided at the liquid crystal panel,
   wherein at least one of the color filters comprises a polymer layer including a color-converting material converting an incident light thereof into a light in a specific wavelength range and a filter material passing the light in the specific wavelength range,
   density of the color-converting material in the polymer layer is higher at a light-incidence side of the polymer layer than an opposite side thereof,
   density of the filter material is higher at the opposite side of the polymer layer than the light-incidence side thereof, and
   the color-converting material is a dye being dissolved in the polymer layer to form a solid solution.

3. A liquid crystal display device comprising:
   a liquid crystal panel; and
   color filters being provided at the liquid crystal panel,
   wherein at least one of the color filters comprises a polymer layer including a color-converting material converting an incident light thereof into a light in a specific wavelength range and a filter material passing the light in the specific wavelength range,
   density of the color-converting material in the polymer layer is higher at a light-incidence side of the polymer layer than an opposite side thereof,
   density of the filter material is higher at the opposite side of the polymer layer than the light-incidence side thereof, and
   minimum transimissivity of light in a wavelength range being absorbed by the filter material lies in a range greater than 0% and not greater than 50%.

4. A liquid crystal display device comprising:
   a color filter area having a first region corresponding to a first primary color, a second region corresponding to a primary second color with a different wavelength from the first primary color, and a third region corresponding to a third primary color with a different wavelength from the first and second primary colors; and
   a luminaire disposed opposite to the a color filter area and emitting a first light in a wavelength range which includes only the first primary color,
   wherein a first filter layer is formed in the second region, the first filter layer includes a first color-converting material absorbing the first light and converting the first light to a second light having a wavelength of the second primary color and a first filter material passing the second light,
   a second filter layer is formed in the third region, the second filter layer includes a second color-converting material absorbing the first light and converting the first light to a third light having a wavelength of the third primary color and a second filter material passing the third light,
   no filter layer including at least one of the first and second color-converting materials is formed in the first region,
   density of the first color-converting material in the first filter layer is higher at one side of the first filter layer closer to the luminaire than an opposite side thereof,
   density of the first filter material in the first filter layer is higher at the opposite side of the first filter layer than said one side thereof,
   density of the second color-converting material in the second filter layer is higher at one side of the second filter layer closer to the luminaire than an opposite side thereof, and
   density of the second filter material in the second filter layer is higher at the opposite side of the second filter layer than said one side thereof.

5. A liquid crystal display device according to claim 4, wherein at least one of the first filter material and the second filter material shows a minimum transimissivity in a wavelength range being absorbed thereby lies in a range greater than 0% and not greater than 50%.

* * * * *